United States Patent
Schur

(10) Patent No.: US 11,232,523 B2
(45) Date of Patent: Jan. 25, 2022

(54) SYSTEM AND METHOD FOR PROVIDING AN INTELLIGENT OPERATING INTERFACE AND INTELLIGENT PERSONAL ASSISTANT AS A SERVICE ON A CRYPTO SECURE SOCIAL MEDIA AND CROSS BRIDGE SERVICE WITH CONTINUOUS PROSUMER VALIDATION BASED ON I-OPERANT TAGS, I-BUBBLE TAGS, DEMOJIS AND DEMOTICONS

(71) Applicant: Patrick Schur, Magden (CH)

(72) Inventor: Patrick Schur, Magden (CH)

( * ) Notice: Subject to any disclaimer, the term of this patent is extended or adjusted under 35 U.S.C. 154(b) by 371 days.

(21) Appl. No.: 15/859,919

(22) Filed: Jan. 2, 2018

(65) Prior Publication Data

US 2019/0205998 A1 Jul. 4, 2019

(51) Int. Cl.
*G06Q 50/00* (2012.01)
*G06Q 10/06* (2012.01)
(Continued)

(52) U.S. Cl.
CPC .......... *G06Q 50/01* (2013.01); *G06F 16/9038* (2019.01); *G06F 16/9535* (2019.01); *G06Q 10/063112* (2013.01); *G06Q 10/10* (2013.01); *G06Q 10/101* (2013.01); *G06Q 10/1053* (2013.01); *G06Q 30/0645* (2013.01)

(58) Field of Classification Search
CPC ............ G06Q 50/01; G06Q 10/063112; G06F 16/9038; G06F 16/9535
See application file for complete search history.

(56) References Cited

U.S. PATENT DOCUMENTS

2004/0049345 A1  3/2004  McDonough et al.
2007/0226032 A1  9/2007  White et al.
(Continued)

FOREIGN PATENT DOCUMENTS

| WO | 2005015404 A2 | 2/2005 |
| WO | 2017044300 A1 | 3/2017 |
| WO | 2017127850 A1 | 7/2017 |

OTHER PUBLICATIONS

Praveena et al, Ensuring data security in cloud based social networks, Apr. 2017 (Year: 2017).*
(Continued)

*Primary Examiner* — Mohamed N El-Bathy
(74) *Attorney, Agent, or Firm* — Gearhart Law, LLC; David Postolski, Esq.

(57) ABSTRACT

Disclosed embodiments provide a prosumer crypto social media and cross bridge service collaboration platform in a secure and trusted network based on crypto technology, which helps to manage information workflow, and improves collaboration between amateurs, knowledge workers and service providers. Digital transactions are enabled in a collaborative environment. Virtual information points are rendered in a mixed reality view. When selected, notifications based on the selected virtual information points are displayed. Search results are rendered graphically, and selection of related results can be achieved via user interaction with graphical elements. Emojis and D-emojis/D-emoticons are used to interact with network participants, enabling a new level of collaboration and feedback amongst the participants.

10 Claims, 29 Drawing Sheets

(51) Int. Cl.
*G06Q 10/10* (2012.01)
*G06Q 30/06* (2012.01)
*G06F 16/9038* (2019.01)
*G06F 16/9535* (2019.01)

(56) References Cited

U.S. PATENT DOCUMENTS

| | | |
|---|---|---|
| 2013/0185368 A1 | 7/2013 | Nordstrom et al. |
| 2014/0067483 A1 | 3/2014 | Jeong et al. |
| 2015/0127565 A1* | 5/2015 | Chevalier .............. G06Q 10/00 705/319 |
| 2016/0188682 A1* | 6/2016 | Silverstein ............ G06F 16/248 707/803 |
| 2017/0031676 A1 | 2/2017 | Cecchetti et al. |
| 2017/0109667 A1 | 4/2017 | Marcu et al. |
| 2017/0109676 A1 | 4/2017 | Marcu et al. |
| 2017/0185981 A1* | 6/2017 | Emmerson ........... G10H 1/0058 |
| 2017/0214701 A1 | 7/2017 | Hasan |
| 2017/0221032 A1 | 8/2017 | Mazed |
| 2017/0353508 A1 | 12/2017 | Yoakum |
| 2018/0130050 A1* | 5/2018 | Taylor .................. H04L 9/3247 |
| 2019/0103192 A1* | 4/2019 | Bent ..................... H04L 9/3247 |
| 2019/0349426 A1* | 11/2019 | Smith ................... H04W 84/22 |

OTHER PUBLICATIONS

International Search Report and Written Opinion dated May 6, 2019, for corresponding International Application No. PCT/IB2019/050033, consisting of 13-pages.

* cited by examiner

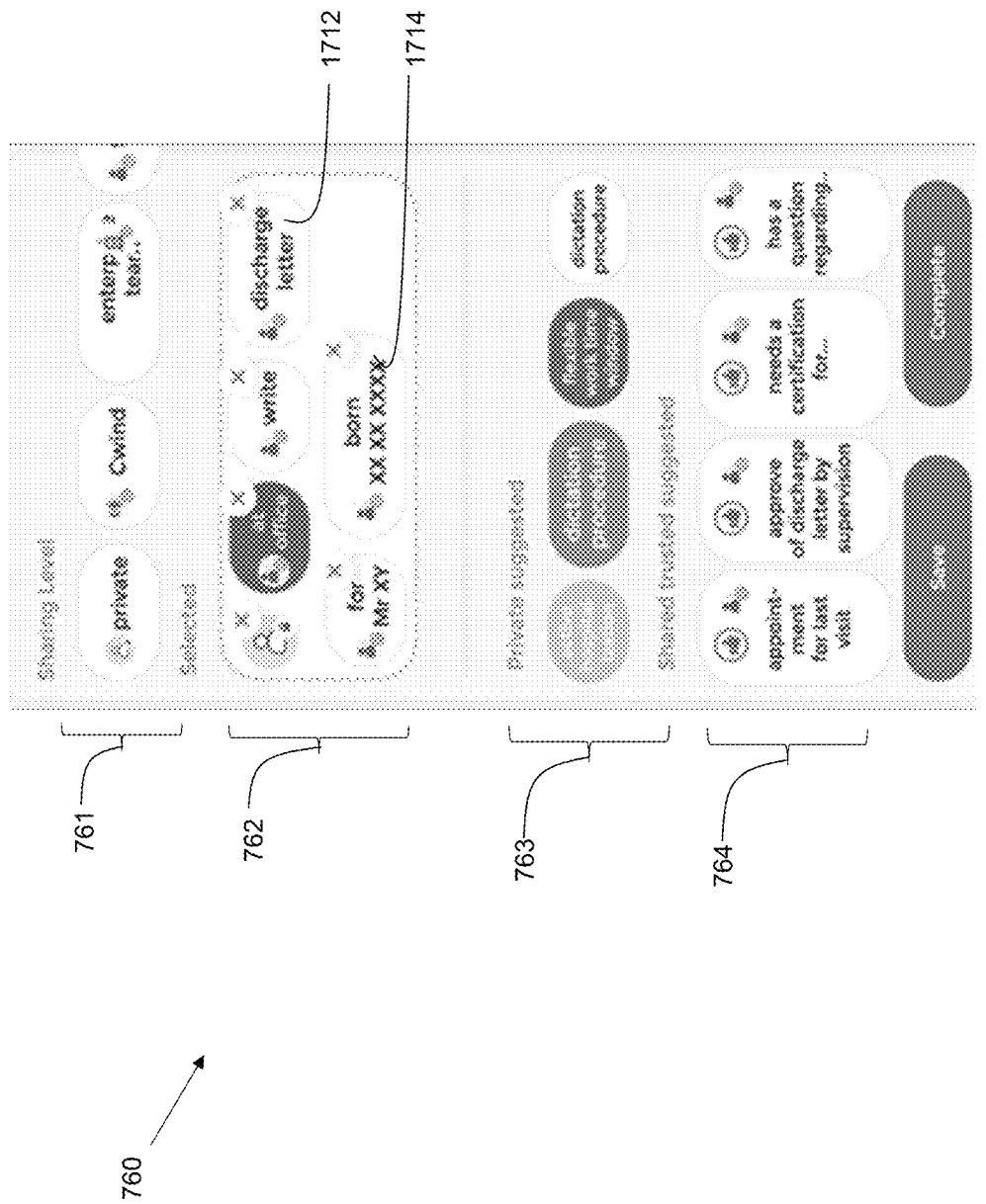

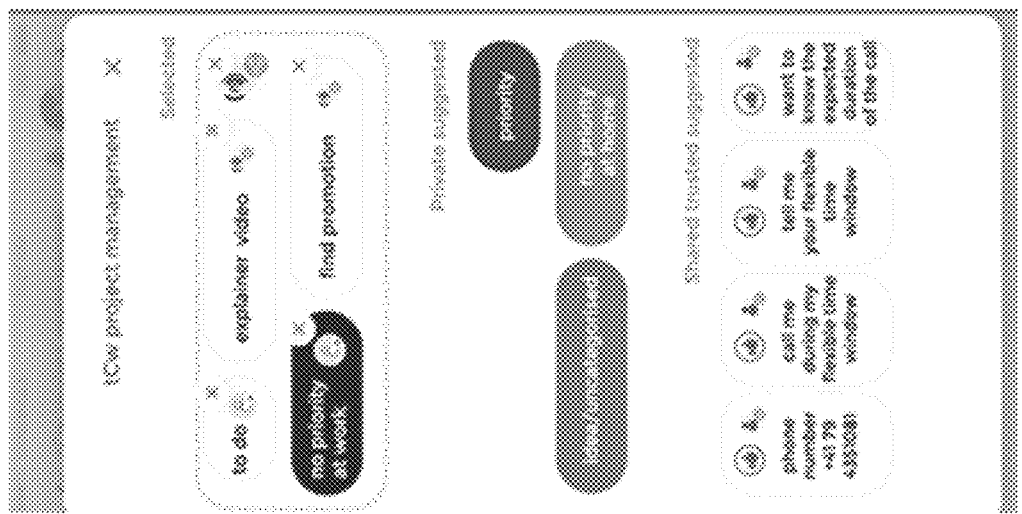
FIG. 7M
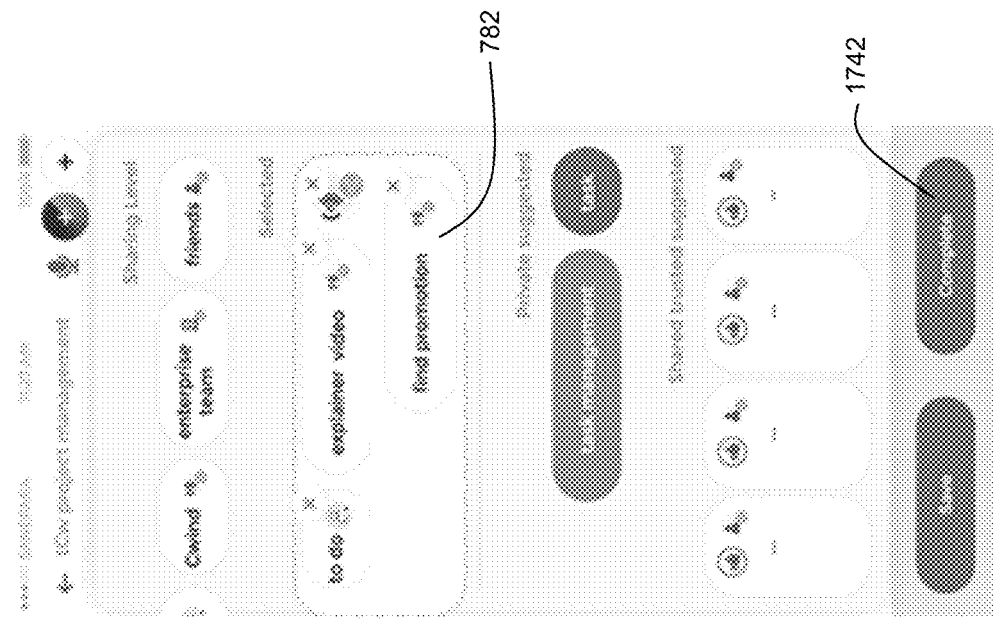

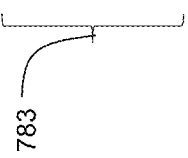
FIG. 7L

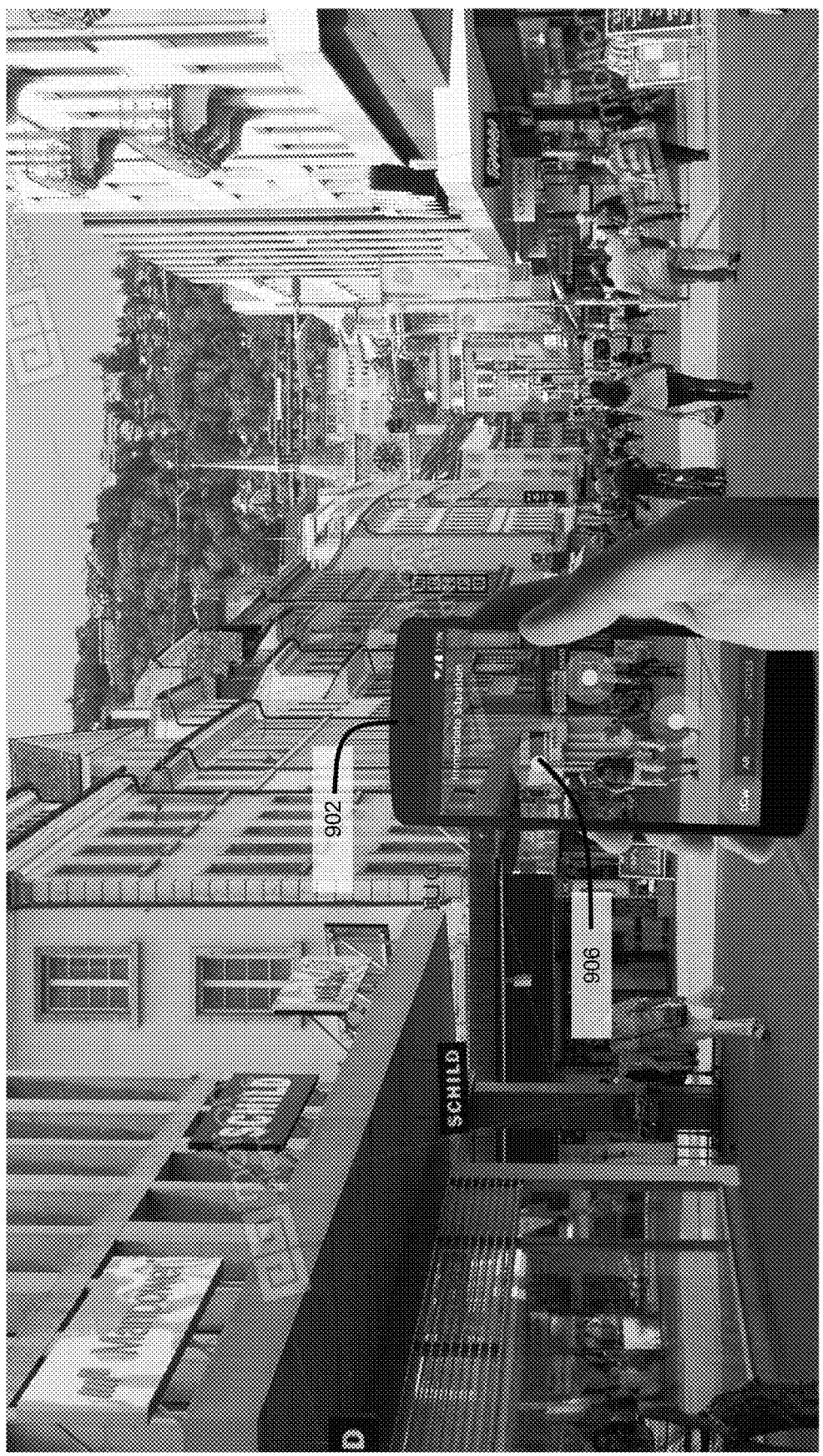

SYSTEM AND METHOD FOR PROVIDING
AN INTELLIGENT OPERATING INTERFACE
AND INTELLIGENT PERSONAL ASSISTANT
AS A SERVICE ON A CRYPTO SECURE
SOCIAL MEDIA AND CROSS BRIDGE
SERVICE WITH CONTINUOUS PROSUMER
VALIDATION BASED ON I-OPERANT TAGS,
I-BUBBLE TAGS, DEMOJIS AND
DEMOTICONS

FIELD OF THE EMBODIMENTS

The present embodiments relate generally to social media and service systems.

BACKGROUND

With the advent of smartphones, as well as improvements in battery and memory technology, people are increasingly using mobile devices and/or computers as part of their daily lives. Today, nearly everybody uses mobile devices, computers, papers and personal interaction at work and at home, and sometimes at the same time. Applications are based on developer defined menus without any possibilities for user adoption. This can cause a cognitive overload resulting from over-channeling and over-processing, resulting in misinformation and incorrect decisions. It is therefore desirable to have improvements in social media and service collaboration.

SUMMARY OF THE EMBODIMENTS

Disclosed embodiments provide a computer-implemented method for multiparty collaboration, comprising: receiving a service request; determining a skill set corresponding to the service request; performing a query based on at least one skill of the skill set; receiving a result set based on the service request; and generating a computerized response to the service request, wherein the result set includes one or more profile entries corresponding to the at least one skill.

Disclosed embodiments further include sorting the result set based on ranking criteria.

In embodiments, the ranking criteria includes a number of social media followers of an account associated with one of the one or more profile entries.

In embodiments, the ranking criteria includes a previous employer of an account associated with one of the one or more profile entries.

In embodiments, the ranking criteria includes a number of projects associated with an account associated with one of the one or more profile entries.

Disclosed embodiments further include generating an offer for a service; and sending the offer to an account associated with a profile of the one or more profile entries.

Disclosed embodiments further include receiving an acceptance for the offer.

Disclosed embodiments further include receiving a rating for the service.

Disclosed embodiments further include storing the rating in a database.

Disclosed embodiments include a computer-implemented method for multiparty collaboration, comprising: rendering a mixed reality view of a scene; rendering one or more virtual information points on the scene, wherein each of the one or more virtual information points corresponds to a notification; and in response to receiving a selection of one of the one or more virtual information points, rendering a corresponding notification for the selected virtual information point.

In embodiments, the notification includes an offer for a job, service, or product.

In embodiments, the notification includes an application control.

In embodiments, the notification includes an offer for sale, purchase, or rental.

In embodiments, the notification further includes a job application control.

In embodiments, the notification includes a rental offer.

In embodiments, the notification further includes an application control.

In embodiments, the application control includes a rental application control.

Disclosed embodiments provide a computer-implemented method for graphically indicating search result relevance, comprising: performing a search based on a received search query; receiving a result set based on the search query; classifying the result set by category; ranking the result set by relevance; rendering a graphical display comprising a plurality of circular shaped graphical elements, wherein each circular shaped graphical element corresponds to a result of the result set.

In embodiments, a size of each circular shaped graphical element is based on relevance.

In embodiments, a color of each circular shaped graphical element is based on category.

In embodiments, the circular shaped graphical element, upon selection, renders a text label of a current item.

In embodiments, the circular shaped graphical element, upon selection, renders a text label of a related item in a corresponding segment.

Disclosed embodiments can further include rendering the related item upon receiving a selection of the corresponding segment.

BRIEF DESCRIPTION OF THE DRAWINGS

FIG. 7C-7o shows examples of D-emojis/D-emoticons based on low level and high level operant tag(s), operant tag sequence(s) and operant tag circle(s).

FIG. 9A-9C show another mixed reality user experience in accordance with embodiments of the present invention.

The structure, operation, and advantages of disclosed embodiments will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity.

DETAILED DESCRIPTION

Disclosed embodiments provide a prosumer crypto social media and cross-bridge service collaboration platform in a secure and trusted network based on crypto technology (such as the Cwind service chains/hashgraph chain/blockchain technology), which helps to manage activities and information workflow, and improves multiparty collaboration and (trusted) multichanneling between amateurs, knowledge workers and service providers and their specific sharing of information. Disclosed embodiments further serve as a community connector with social, peer to peer and knowledge networks built on crypto technologies that facilitates the trusted exchange of goods and services between suppliers and end users. Disclosed embodiments enable improved in context management of notes, searches, contacts, responsibilities, information and file sharing, two-/multi-sided confirmed appointments, two-/multi-sided bookings/sales/data requests, events, postings, status tracking, procedures, invoicing/payments, advertise, ratings, two-/multi-sided decision making, support, negotiations, trusted voting, trusted signing, engaging, hiring and other transactional exchanges. This allows creation of a unique and superior information channel with excellence in customer service and serviceability.

Figure 1:
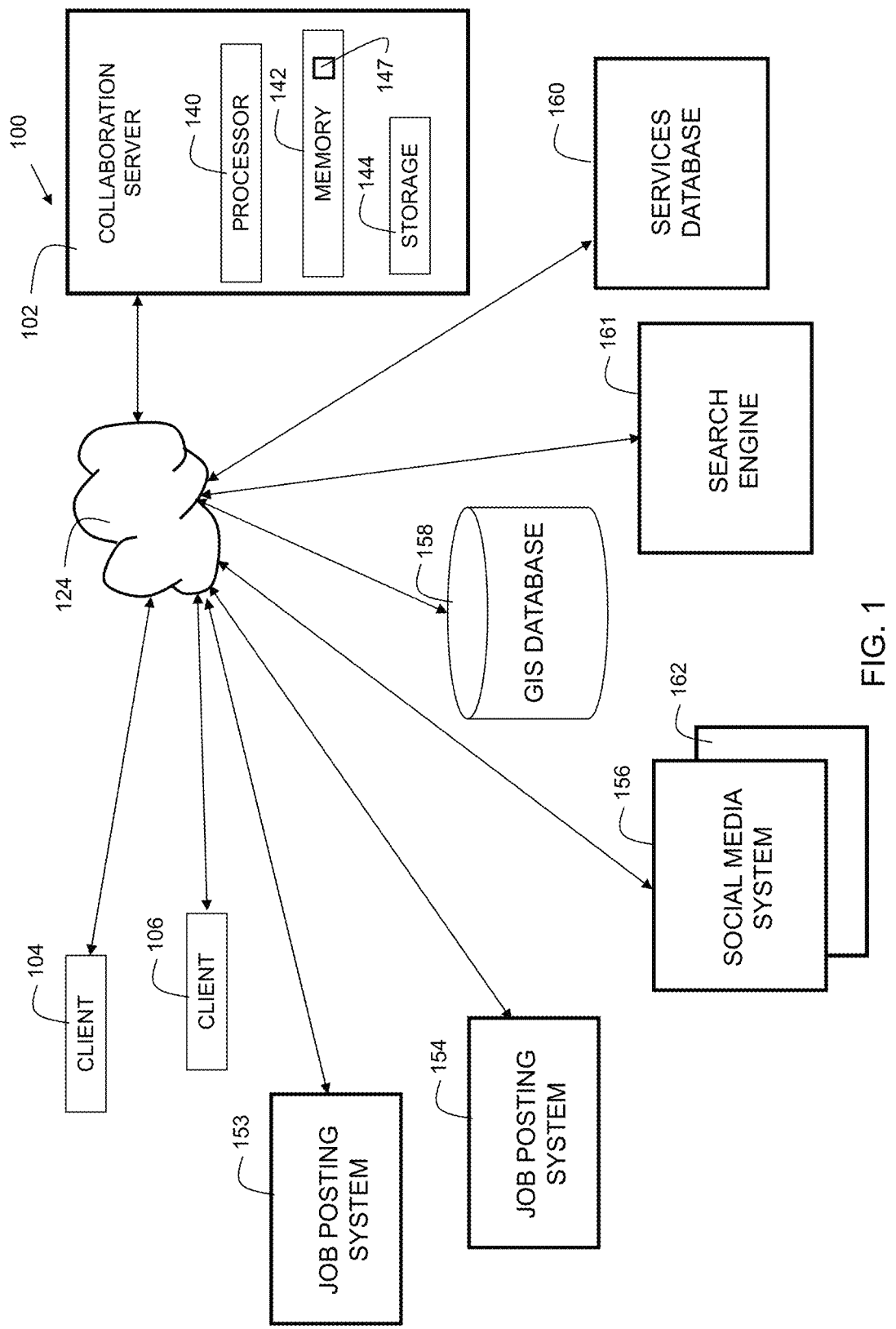
FIG. 1 is a diagram of a system in accordance with embodiments of the present invention.

FIG. 1 is a diagram of a system 100 in accordance with embodiments of the present invention. A collaboration server 102 can be implemented in an electronic computing device that includes a processor 140, a memory 142 coupled to the processor, and storage 144, also coupled to the processor 140. Memory 142 contains program instructions 147, that when executed by the processor 140, cause the collaboration server 102 to perform steps in accordance with embodiments of the present invention. Memory 142 may be a non-transitory computer readable medium. Memory 142 may include, but is not limited to, flash, read-only memory (ROM), static random-access memory (SRAM), magnetic storage, optical storage, or other suitable storage mechanism. Storage 144 may include one or more magnetic hard disk drives (HDD), solid state disk drives (SSD), optical storage devices, tape drives, and/or other suitable storage devices.

The processor 140 may include multiple cores. In embodiments, the collaboration server 102 may include multiple processors, where each processor includes multiple cores. Embodiments may schedule tasks and threads over multiple processors and/or cores to achieve a level of parallelism in execution of various tasks such as computations, searching, comparing, and/or rendering.

The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet can be provided by Internet service providers (ISP). Users on client systems, such as client devices 104 and 106 obtain access to the Internet through the Internet service providers. Access to the Internet allows users of the client computer systems to exchange information, receive and send e-mails, and view documents, such as documents which have been prepared in the HTML format. These documents are often provided by web servers which are considered to be "on" the Internet. Often these web servers are provided by the ISPs, although a computer system can be set up and connected to the Internet without that system being also an ISP as is well known in the art. Embodiments may further utilize one or more load balancers to manage traffic to one or more instances of a collaboration server.

One or more client devices, indicated as 104 and 106 may be connected to network 124 via a wired or wireless interface. Client devices 104 and 106 may include a mobile computing device such as a smartphone or tablet, a laptop computer, a desktop computer, or other suitable computing device. The client-server architecture allows a user to remotely access features of the collaboration server 102.

Embodiments of the present invention may utilize a JavaScript Object Notation (JSON) web service to make a JSON call to the collaboration server 102. In some examples, the JSON call is made using XML HTTP, which implements an XML HTTP object that has functionality enabling the exchange of Extensible Markup Language (XML) data directly over the Internet using the Hypertext Transfer Protocol (HTTP). The XML HTTP object allows access of the collaboration server data, parsing the data using an XML Document Object Model (DOM), and posting XML data through a standard firewall directly to an HTTP server. In some embodiments, HTML5, Bootstrap, CSS3, Ecmascript, and/or Ember.js, and/or Angular JS may also be used.

Some embodiments may further utilize a Structured Query Language (SQL) database for storage and retrieval of program application data. A variety of data store technologies may be used, including, but not limited to, PostgreSQL, Redis, and/or Elasticsearch.

The collaboration server 102 may be connected to a plurality of networked databases. One such database may include Geographic Information Systems (GIS) database 158. The GIS database 158 may include a record for geographical coordinates, addresses, roads, national boundaries, zoning categories (commercial, industrial, residential, farmland, forest, etc.), climate information, soil information, landscape/terrain information, and/or other pertinent information.

Another database may include services database 160. The services database 160 may include multiple database records storing profile entries for firms, professionals, knowledge workers, and/or amateurs. For each firm and/or individual in the services database 160, a record with fields such as specialization, location, cost, size, professional experience, number of projects worked on, number of followers, number of blog posts, and/or other fields is stored. This allows the collaboration server 102 to perform a sorting of a result set based on ranking criteria. The ranking criteria can include, but is not limited to, a number of social media followers of an account associated with one of the profile entries, a previous employer of an account associated with one of the profile entries, and/or a number of projects associated with an account associated with one of the profile entries.

Additionally, the collaboration server may be interfaced to one or more social media systems, indicated as 156 and 162 via network 124. In embodiments, records from social media systems such as Facebook®, Whatsapp®, Viber®, ICQ®, Quora®, Podio®, telegram.org®, basecamp3®, Wrike®, Slack®, WeChat®, Xing®, VPN®, researchgate.net and/or LinkedIn® may be accessed by the collaboration server 102 via published Application Programming Interface (API) calls. In this way, searches initiated by the collaboration server can access information from existing social media systems and directly connected to operant tag(s).

Additionally, the collaboration server may be interfaced to one or more posting systems, indicated as 153 and 154 via network 124. In embodiments, records from posting systems such as Indeed™, Monster, and/or other employment listing systems may be accessed by the collaboration server 102 via published Application Programming Interface (API) calls. In this way, searches initiated by the collaboration server can access information from existing posting systems.

Additionally, the collaboration server may be interfaced to one or more search engines, indicated generally as 161. The search engines may be indexed search engines for general internet content, and/or specialized search engines, such as for legal databases, regulation databases, and/or other corpuses. These can provide data to the collaboration server in response to various search queries.

With seamless integration into a variety of systems, the collaboration server is able to provide timely and concise information regarding a variety of business applications to users via client devices. Disclosed embodiments enable the connecting of the world of amateurs and knowledge workers. This provides the ability to improve the quality of living and collaboration for all parties (amateurs and knowledge workers (kw)). This can be applied to a variety of industries, including, but not limited to, healthcare, banking, legal, and/or public administration, and can serve to reduce the overhead of any company.

Figure 2:
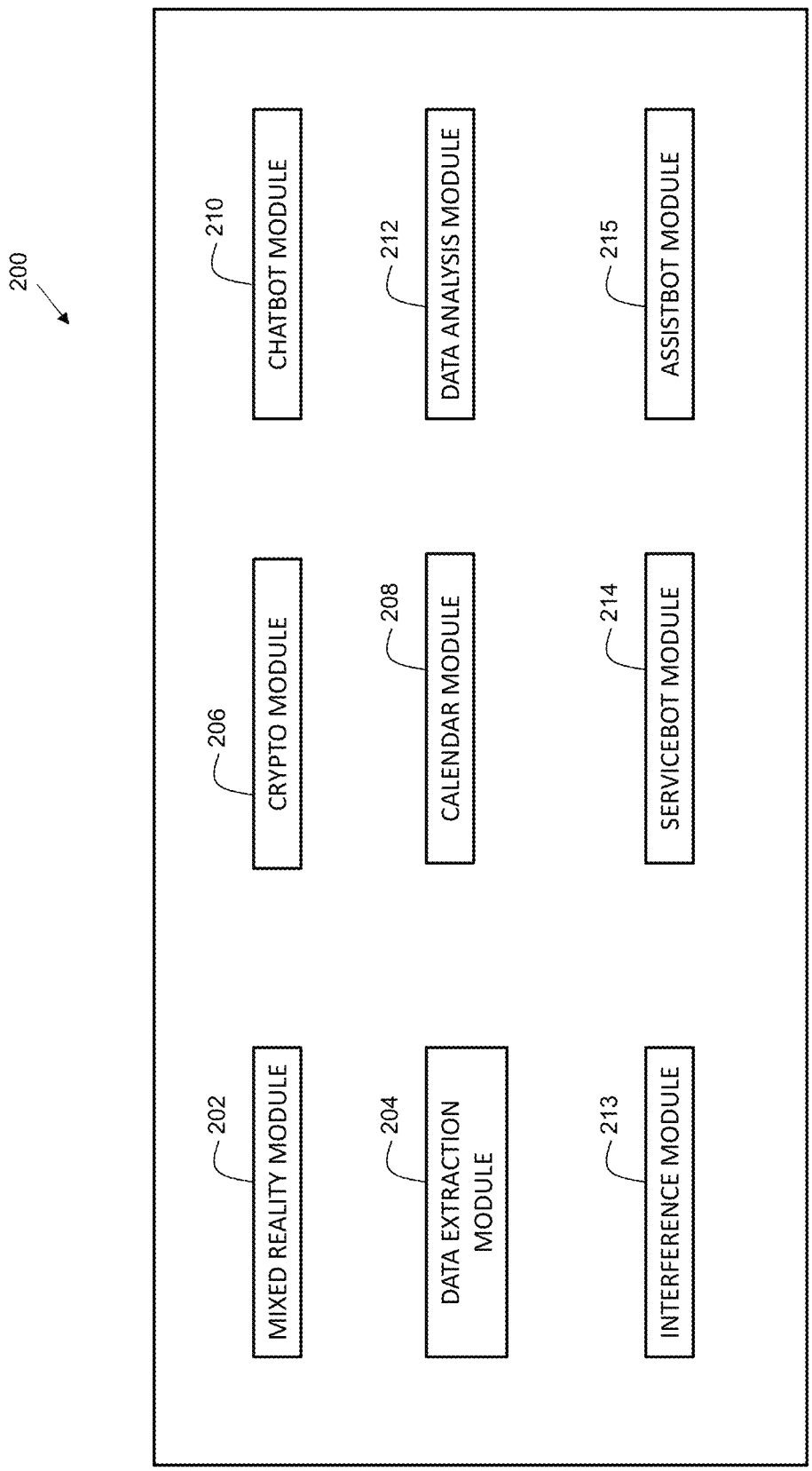
FIG. 2 is a block diagram of modules in accordance with embodiments of the present invention.

FIG. 2 is a diagram 200 of modules in accordance with embodiments of the present invention. In embodiments, the modules may be implemented via software executing on collaboration server 102 and/or associated client devices. In some embodiments, one or more of the modules shown in FIG. 2 may be implemented in software, dedicated hardware, or a combination of both hardware and software. The modules can include a mixed reality module 202. The mixed reality module 202 can render a display on a client device that is a mixture of real-world images and virtual objects and information superimposed on the real-world images. This opens up many possibilities in terms of commercial and social applications The modules can include a data extraction module 204. This can include software and/or hardware functionality for extracting data from websites, social media systems, posting systems, government databases, and/or other repositories of information. This information can be used in intelligent searches, natural language processing, and/or other applications.

The modules can include a crypto module 206. The crypto module may provide networking constructs enabling distributed redundancy with no single point of failure, such as the Cwind service chains/hashgraph chains and/or blockchains. Similar to a ledger, the Cwind/hashgraph/blockchain records and indexes each movement of an entity, creating a searchable database of every transaction in the process. However, unlike traditional digital ledgers that record information on a central server, the Cwind service chain/hashgraph chain/blockchain stores transaction data across vast networks of computers that constantly check and verify information with each other. Furthermore, it offers transparency since data is embodied within the entire network and thus, is public. Each record or transaction is furthermore resistant to corruption or unauthorized altering of contents due to the decentralized nature of the network. Embodiments of the present invention may utilize the Cwind service chains/hashgraph chains/blockchains for tracking transactions such as payments in cryptocurrencies, digital deliverables, and/or other business/consumer transactions.

The modules can include a calendar module 208. The calendar module 208 can include functionality for tracking dates, meetings, appointments, travel schedules, and/or project schedules. The dates can include deliverable dates for deliverables provided by various knowledge workers engaged in a project.

The modules can include a chatbot module 210. The chatbot module may utilize natural language processing to provide communication to a human user. In embodiments, the chatbot may provide textual responses utilizing an instant messaging type of communication. In embodiments, natural language processing (NLP) may be used to extract information from a text input from a human user, and generate a corresponding response. In embodiments, the natural language processing can include, but is not limited to, categorizing of content, entity extraction, clustering content, fact extraction, and/or relationship extraction. The natural language processing can be used for tasks such as social media monitoring, formulating responses to questions, text analytics, and/or big data applications.

In embodiments, the chatbot can be used to handle initial contact with a human user, provide initial information, and then transfer the conversation to a live human once the initial information is provided. In embodiments, the chatbot may be used for formulating responses to questions, customer service applications, and/or reminder and follow-up applications, among others.

The modules can include a data analysis module 212. The data analysis module 212 can be used to parse data from social media postings, instant messages, e-mail communications, and/or other forms of digital information. The data analysis module 212 may analyze information suitable for use in dashboards and/or other graphical representations.

The modules can include an interference module 213. In embodiments, the interference module 213 may show personalized operant tag sequences in contrast to standard and community shared (trusted) operant tag sequences.

The modules can include a servicebot module 214. In embodiments, the servicebot module 214 may show the team or enterprise workflow or process map based on operant tags and its time and location coincidences to the team operant tags.

The modules can include an assistbot module 215. In embodiments, the assistbot module 215 may show the personal workflow and personal work cycles based on operant tags in context of all operant tag defined situations (at work, at home, on the way home, on the way to work, or other circumstance). Inputs to these situational operant tags are user activities or other shared activities, IoT, NFS pattern recognition e.g. WLAN, RFID detection, Geolocalization and Voice recognition.

Figure 3:
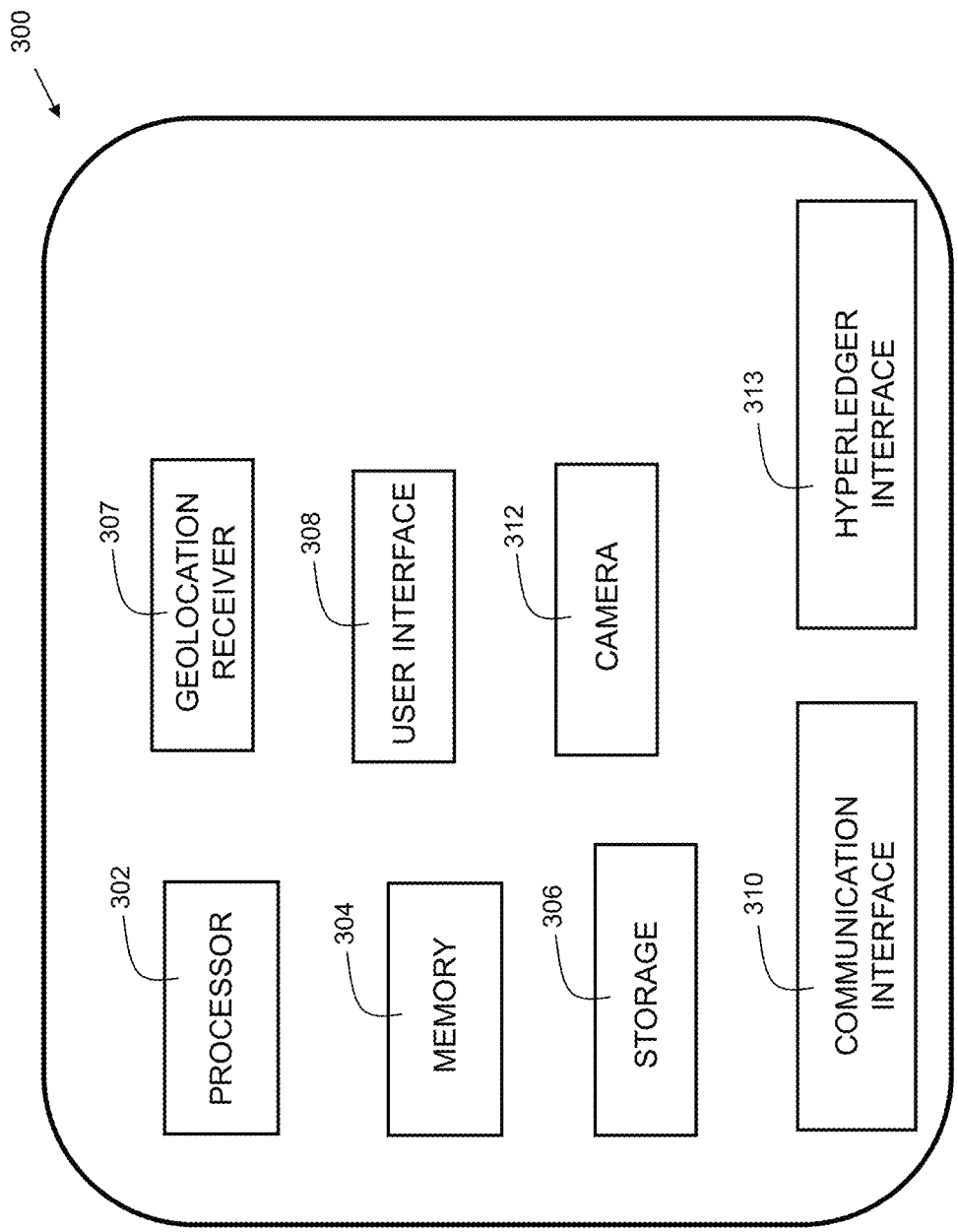
FIG. 3 is a diagram of a client device in accordance with embodiments of the present invention.

FIG. 3 is a block diagram of a client device 300 in accordance with embodiments of the present invention. In embodiments, client device 300 is an electronic device that may include a desktop computer, laptop computer, tablet computer, smartphone, and/or other suitable client device. Client device 300 may be similar to client device 104 or 106 as shown in FIG. 1. Client device 300 includes a processor 302, a memory 304 coupled to the processer 302, and storage 306. The memory 304 may be a non-transitory computer readable medium. Memory 304 may include RAM, ROM, flash, EEPROM, or other suitable storage technology. The memory 304 contains instructions, that when executed by processor 302, enable communication to/from collaboration server 102 of FIG. 1. Client device 300 further includes a network communication interface 310 for performing this communication. In embodiments, network communication interface 310 includes a wireless communications interface such as a cellular data interface and/or a Wi-Fi interface. In embodiments, the storage 306 includes flash, SRAM, one or more hard disk drives (HDDs) and/or solid state disk drives (SDDs).

Device 300 further includes a geolocation receiver 307. Geolocation receiver 307 can operate with a satellite-based location system such as Global Positioning System (GPS), Galileo, GLONASS, or other system now known or hereafter developed. The geolocation receiver 307 enables a mobile device to be location aware, enabling various applications of disclosed embodiments, including, but not limited to, mixed reality applications (e.g. Google maps, GPS, Camera input).

Device 300 furthers includes a user interface 308. User interface 308 may include a keyboard, monitor, mouse, and/or touchscreen, and provides a user with the ability to enter information as necessary to utilize embodiments of the present invention. In embodiments, a user uses the device 300 to access the functionality of the collaboration server 102. Device 300 further includes a camera 312. The camera 312 may be used to acquire real-world images for use in mixed reality applications. Device 300 may further include a Hyperledger interface 313. Embodiments may utilize a crypto technology built using Hyperledger Fabric for backend functions, such as keeping a ledger of encrypted data's IDs and storing records of consent. This provides numerous advantages. First and foremost, it allows for permissioning control. Second, there are no gas costs associated with crypto technology because they use predefined verified nodes. That way every time a record is accessed or updated, it doesn't cost money. Third, it allows the platform to verify transactions at greater speeds. Thus, disclosed embodiments provide a system to manage permission and keep immutable records of activities pertaining to those transactions.

Figure 4:
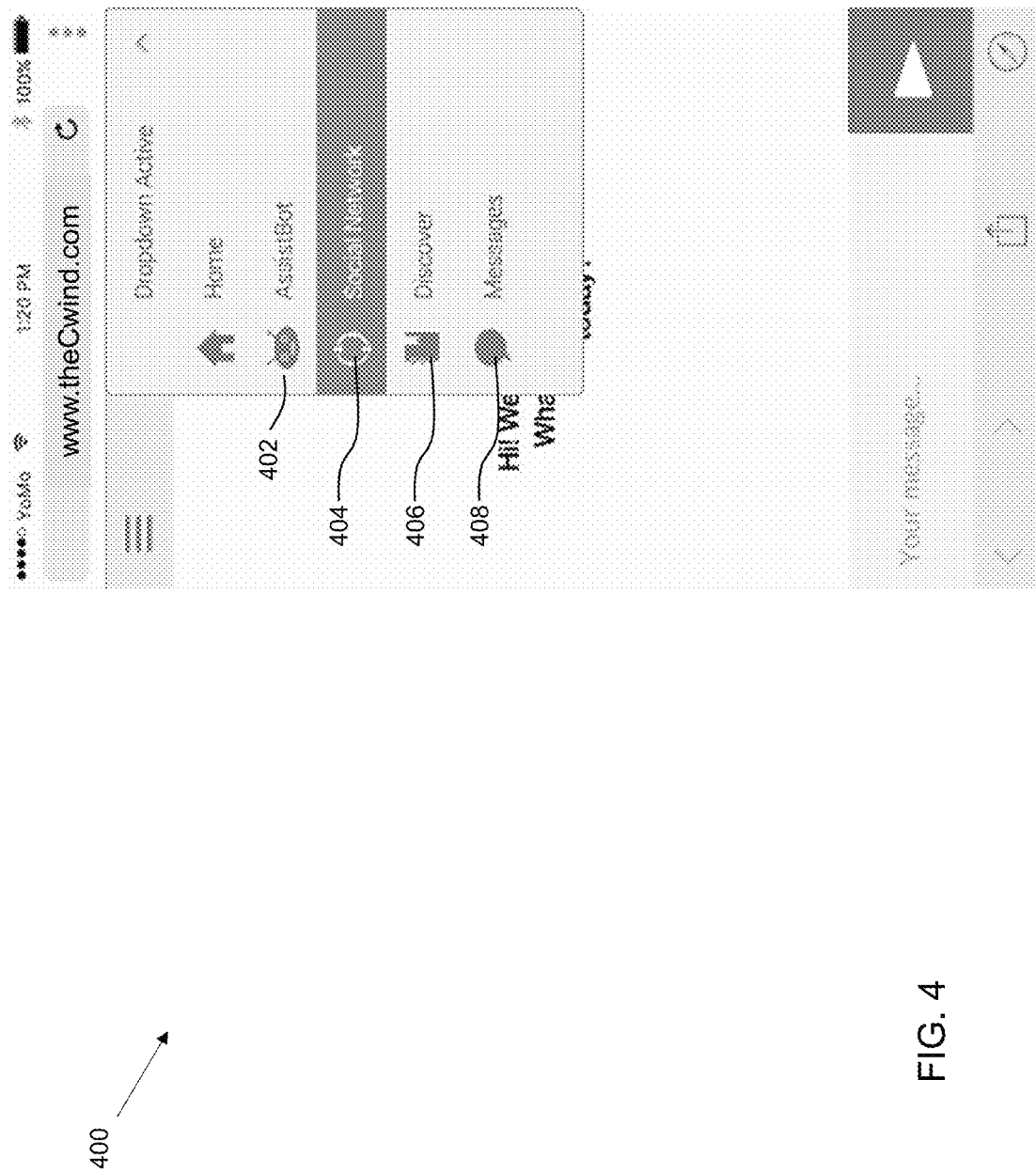
FIG. 4 is an exemplary user interface showing item selection in accordance with embodiments of the present invention of an information and service sharing center.

FIG. 4 is an exemplary user interface 400 showing item selection in accordance with embodiments of the present invention of an information and service sharing center. Interface 400 includes a dropdown menu with a variety of options, including assistbot 402, which allows access to bot configuration options. The dropdown menu may further include a social network option 404, which allows access to social network, chatbot and servicebot preferences such as privacy and notification options. The dropdown menu may further include a discover option 406, which allows access to discover preferences in mixed-reality such as privacy settings, public profile information, and/or other attributes. The dropdown menu may further include a messages/information channel option 408, which allows access to messages/information channel options such as fonts, audible alerts, emoji representations, D-emoji representations, automatic translation options, and/or other messaging/operant tag interferences, cross-service options and prosumer/service provider adopted menus based on operant tag(s).

Figure 5:
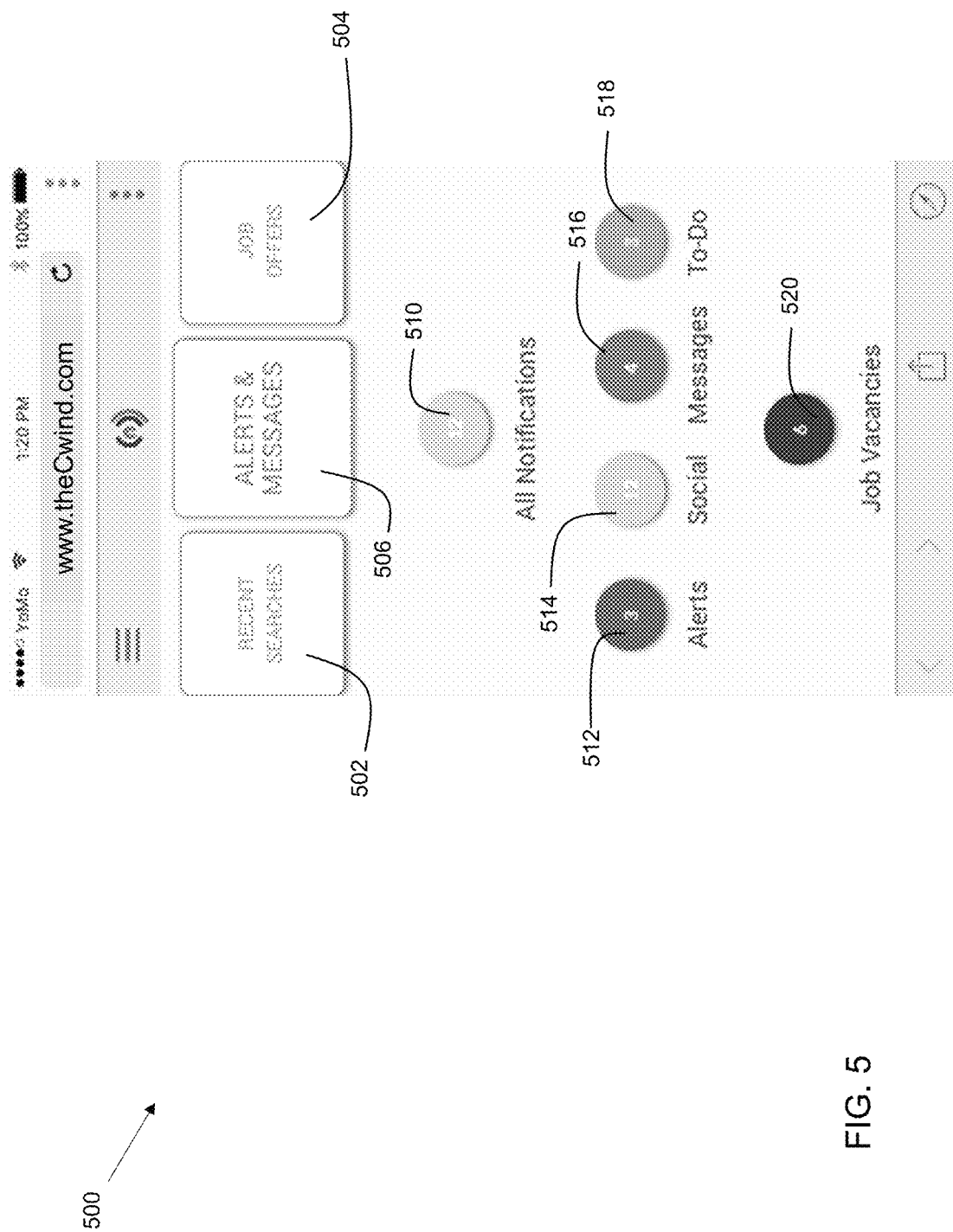
FIG. 5 is an exemplary user interface showing notification types in accordance with embodiments of the present invention of a newsfeed, workfeed, and/or servicefeed for issue-specific sharing or collaboration with a specific sharing level.

FIG. 5 is an exemplary user interface 500 showing notification types in accordance with embodiments of the present invention of a newsfeed, workfeed, and/or service-feed for issue specific sharing or collaboration with a specific sharing level. A top row of buttons includes button 502 for display of recent searches, button 506 for display of alerts and messages, and button 504 for display of job offers.

The notifications can be filtered by a variety of topics. Control 510 enables display of all notifications. Control 512 allows display of alerts. Control 514 allows display of social media notifications. Control 516 allows display of messages. Control 518 allows display of To-Do list notifications. Control 520 allows display of job vacancies. In embodiments, the number of each type of message is shown in the corresponding control. For example, there is a number "6" in the job vacancies control 520, indicating that six job vacancy notifications are available. In embodiments, a user may select more than one control, allowing for complex filtering of notifications. For example, a user selecting control 512 and control 520 has configured the system to provide messages regarding alerts and job vacancies, while filtering out other types of messages.

Figure 6:
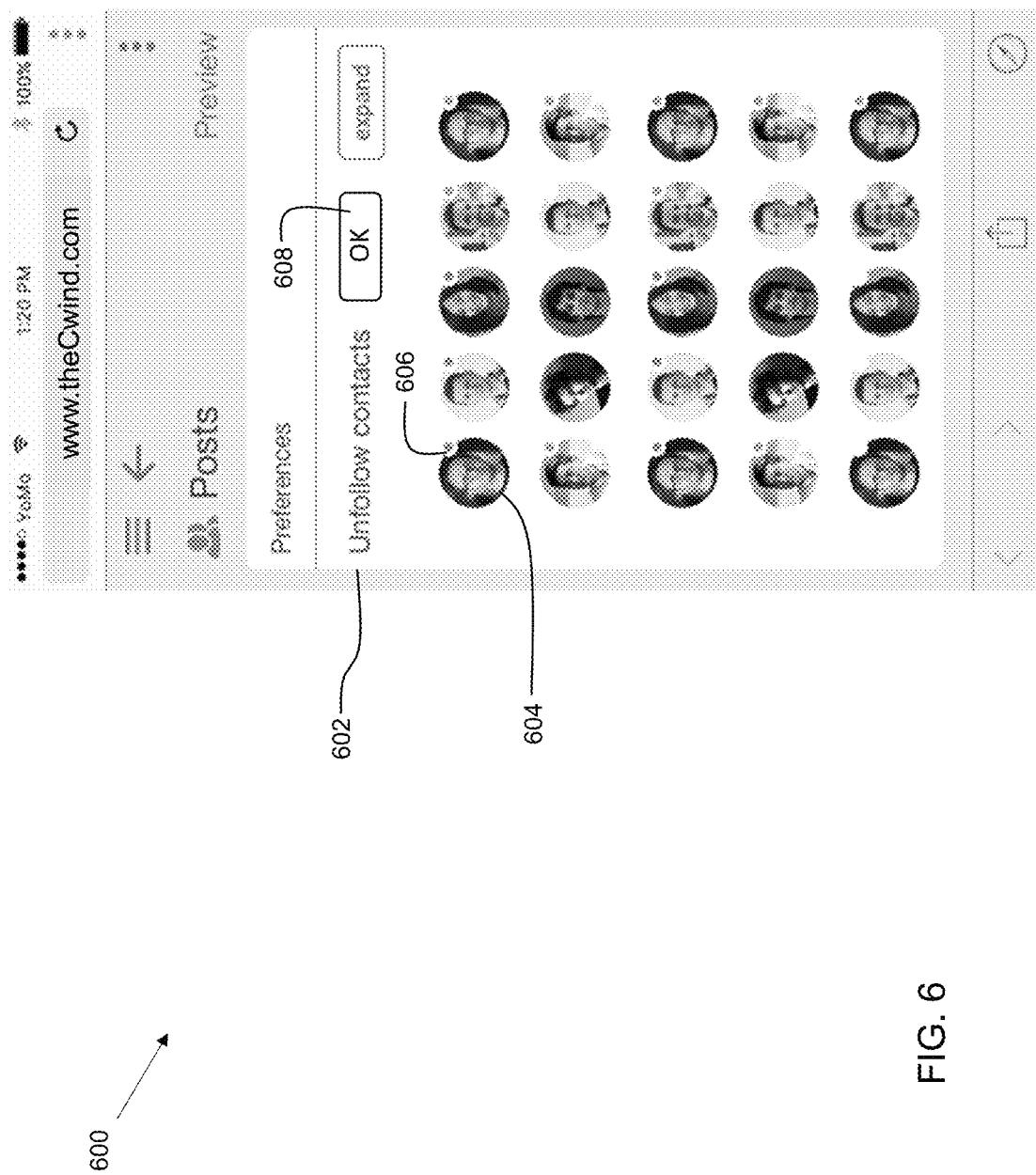
FIG. 6 is an exemplary user interface showing a group contact action in accordance with embodiments of the present invention.

FIG. 6 is an exemplary user interface 600 showing a group contact action in accordance with embodiments of the present invention. A group contact action 602 determines which action is to be performed. In embodiments, each contact is shown as an icon, indicated generally at 604. Each icon may include a photo, avatar, initials, or other indication of the user. Additionally, a communication status indicator 606 may be present for some or all of the contacts. In embodiments, the communication status indicator 606 may utilize a different color and/or pattern to indicate an online status, an away status, an offline status, a busy status, a do not disturb status, and/or other suitable status. A user may select one or more contacts (e.g. by clicking or otherwise selecting the icon) and then perform the action by invoking the OK button 608. Note that while the action of "unfollow contacts" is shown in FIG. 6, in embodiments, other actions are possible. These actions can include, but are not limited to, sending a message, updating a status, and/or other suitable action.

Figure 7A:
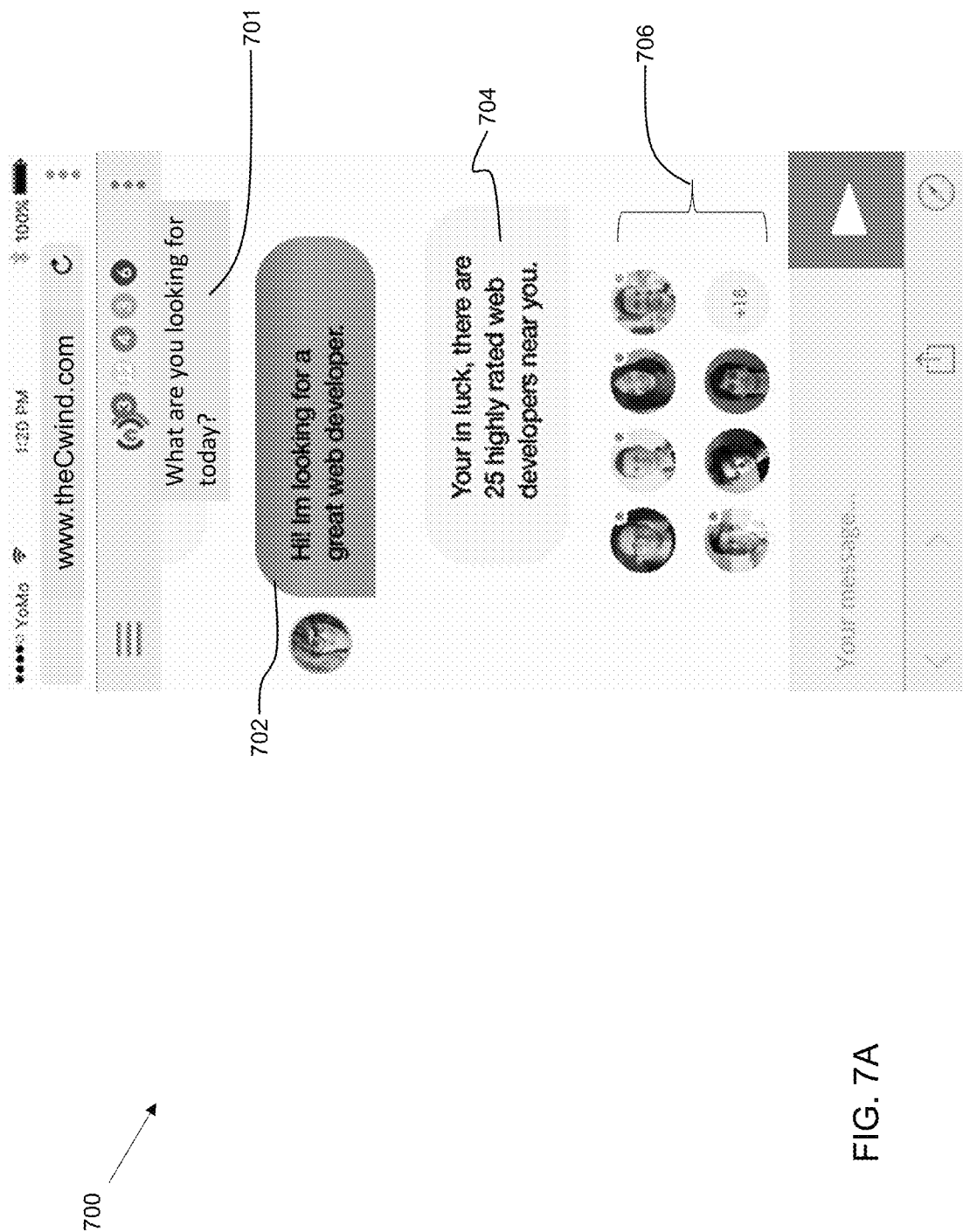
FIG. 7A and FIG. 7B show a communication flow in accordance with embodiments of the present invention.
Figure 7B:
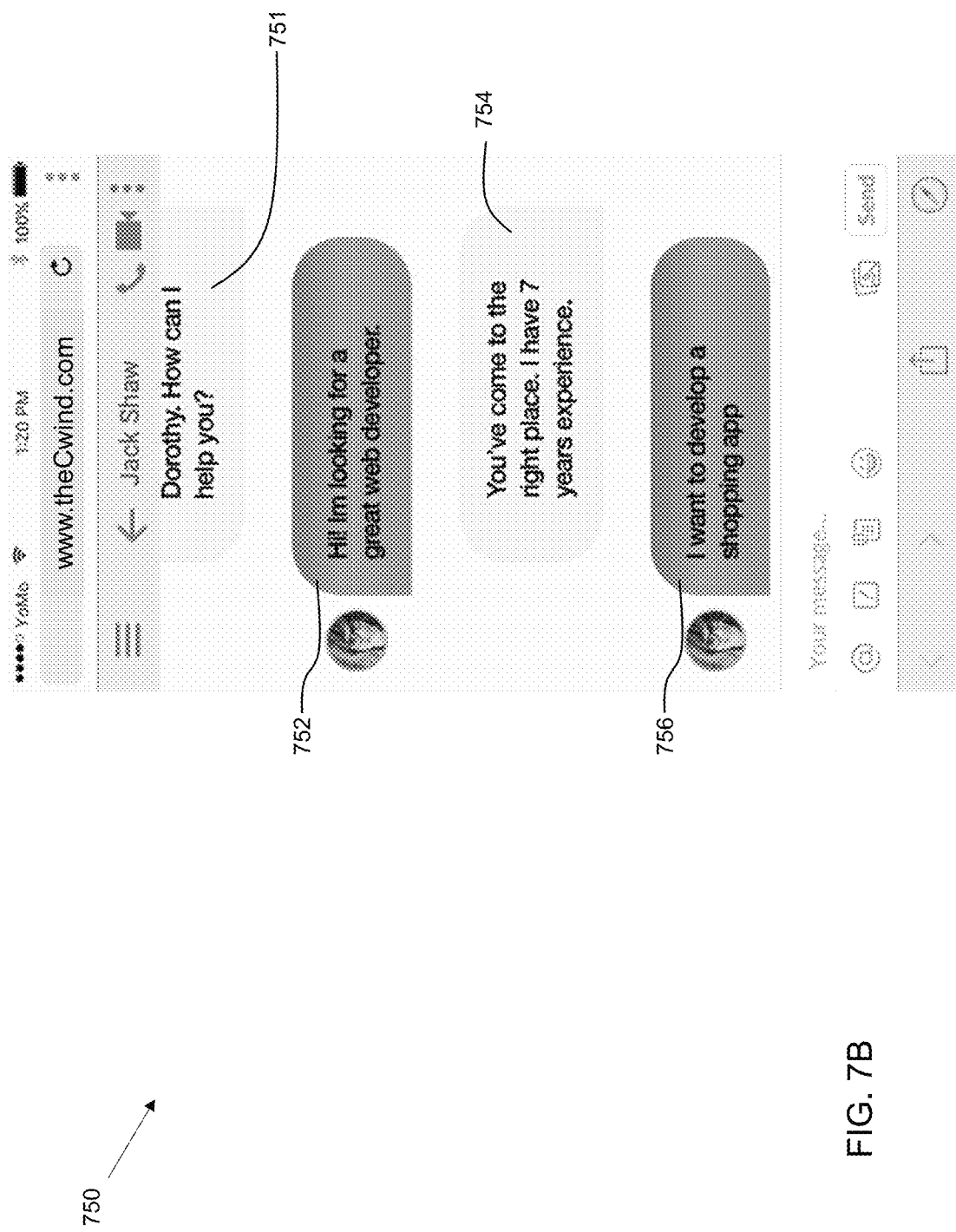

FIG. 7A and FIG. 7B show a communication flow in accordance with embodiments of the present invention. Referring now to FIG. 7A, user interface 700 shows text 701 originating from the collaboration server with the question "What are you looking for today?" In embodiments, question text 701 may originate from a chatbot. A live user then replies with the statement shown at 702. Natural language processing may then process statement 702, and extract the topic of web developer. The chatbot may then reply with statement 704, indicating a number of web developers that match certain criteria. The criteria can include, but is not limited to, geographic proximity, expertise, ratings, experience level, previous employment experience, and/or other factors.

The system may then provide information grid 706 including the list of profile entries matching the criteria, which may be ranked according to relevance, geographical location, hourly rate, and/or other suitable criteria.

Referring now to FIG. 7B having user interface 750, the live user can then initiate contact with one of the profile entries shown in grid 706. The live user associated with the profile entry may respond at 751. The conversation continues with the user seeking knowledge worker services responding at 752. At 754, the knowledge worker responds with his/her experience level, and at 756, the user seeking knowledge worker services responds, and the conversation may continue, possibly culminating in an offer for services. Thus, embodiments can include, generating an offer; and sending the offer to an account associated with a profile of the one or more profile entries. Embodiments can further include receiving an acceptance for the offer. Embodiments can further include receiving a rating for the service once the service is complete. Embodiments can further include storing the rating in a database for future reference. In embodiments, the rating may be provided by the user sending an emoji, or a de-emotionalized emoji (D-emoji, D-emoticon). Emojis are universal, and one of the more prevalent international languages used in the world today. Since emojis are often associated with emotions, using a conventional emoji may skew a user rating. Disclosed embodiments may provide one or more D-emojis/D-emoticons, which may include emoji-sized icons of words (e.g. YES/NO) or other symbols that do not represent a face, thereby potentially soliciting a more objective review of services. Examples of such D-emojis/D-emoticons based on conditioned and connected operant tags are shown in the user interfaces of FIG. 7C-7o.

Referring now to FIG. 7C, a user interface 760 is shown indicating multiple groups of D-emojis/D-emoticons. Group 761 includes privacy-based D-emojis/D-emoticons, with options to allow selection of a group for sharing communication. Group 762 includes content-based D-emojis/D-emoticons, including subject clauses such as "discharge letter" 1712 and "born date" 1714. These content-based D-emojis/D-emoticons may be context specific. As an example, a physician that needs to draft numerous discharge letters may utilize similar subject clauses frequently. In embodiments, machine learning and artificial intelligence techniques may be used to learn over time, which D-emojis/D-emoticons a user needs most frequently, and suggest those D-emojis/D-emoticons accordingly.

Group 763 indicates private suggested D-emojis/D-emoticons including procedures. Group 764 indicates shared trusted suggested D-emojis/D-emoticons for other subjects and/or requests. The D-emojis/D-emoticons shown in this user interface are exemplary, and other D-emojis/D-emoticons may be used in other industries and/or applications.

Figure 7E:
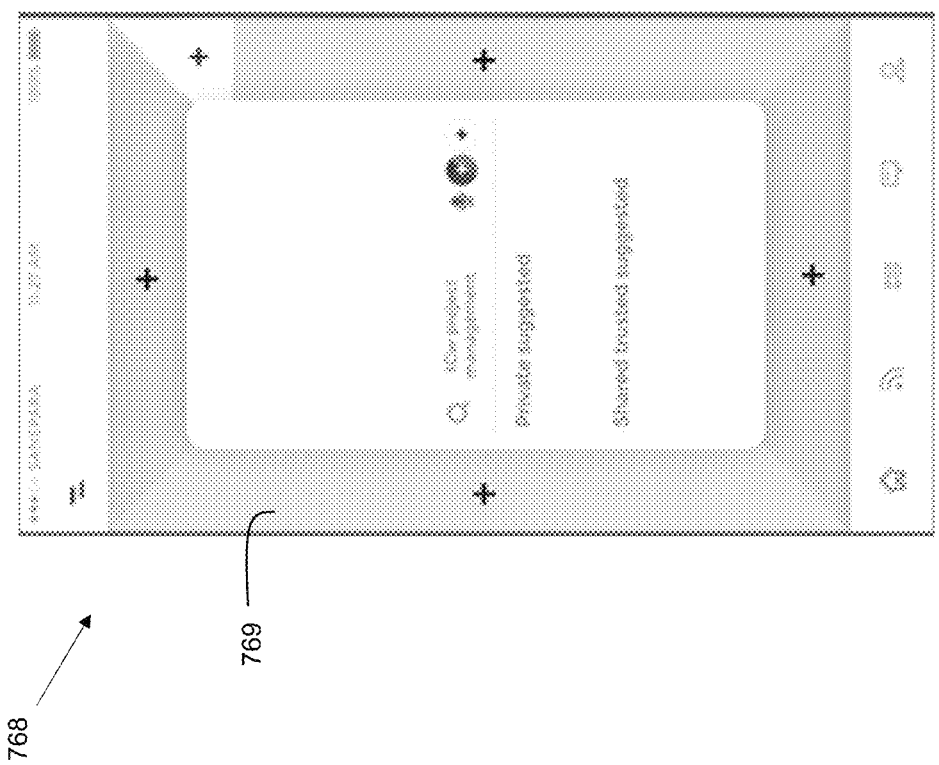
Figure 7D:
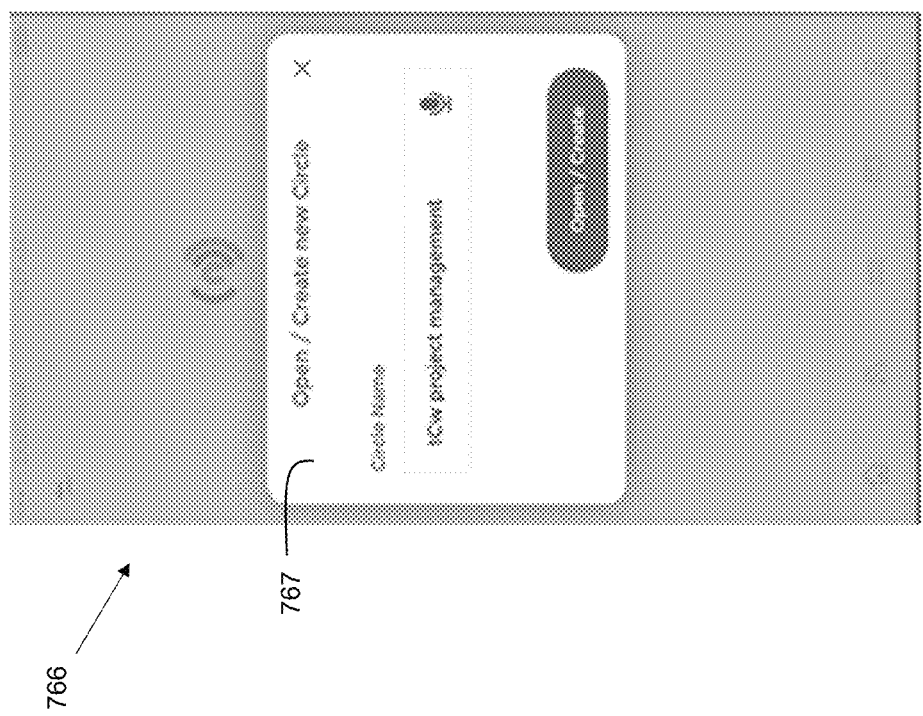

Referring now to FIG. 7D, user interface 766 is shown with dialog window 767 used for opening or creating a new circle. In disclosed embodiments, a "circle" is a construct used for enhanced organizational efficiency. Referring now to FIG. 7E, a user interface 768 shows the creation of a new circle, indicated by frame 769. As shown in FIG. 7E, frame 769 is part of a new circle, and has no operant tags.

Figure 7G:
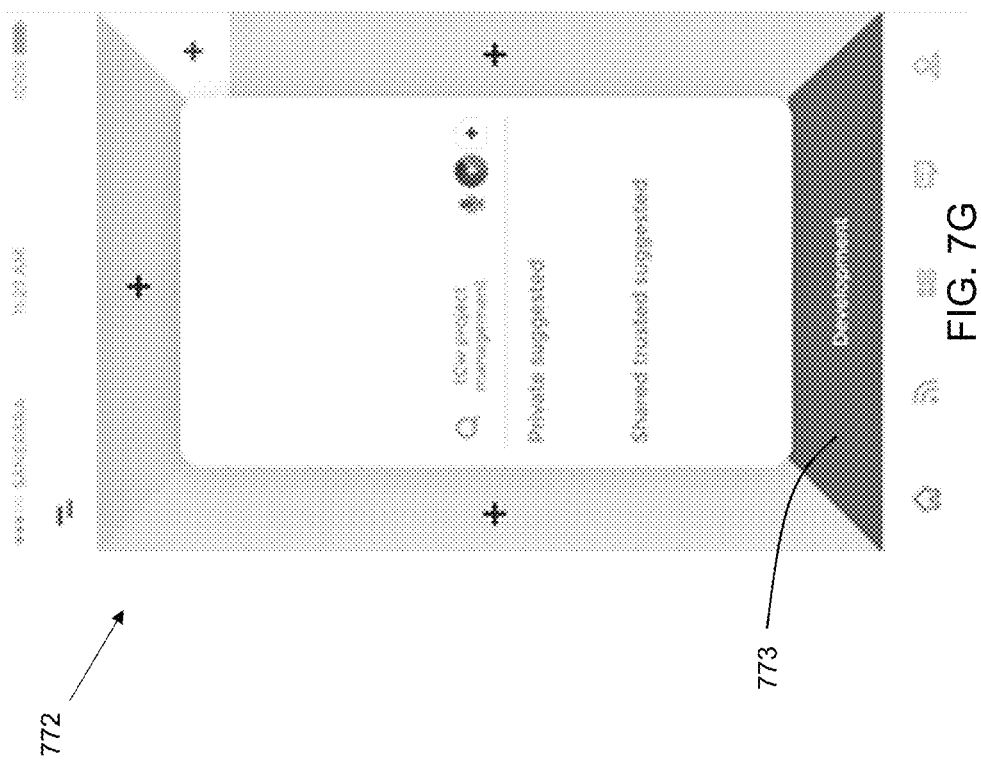
Figure 7F:
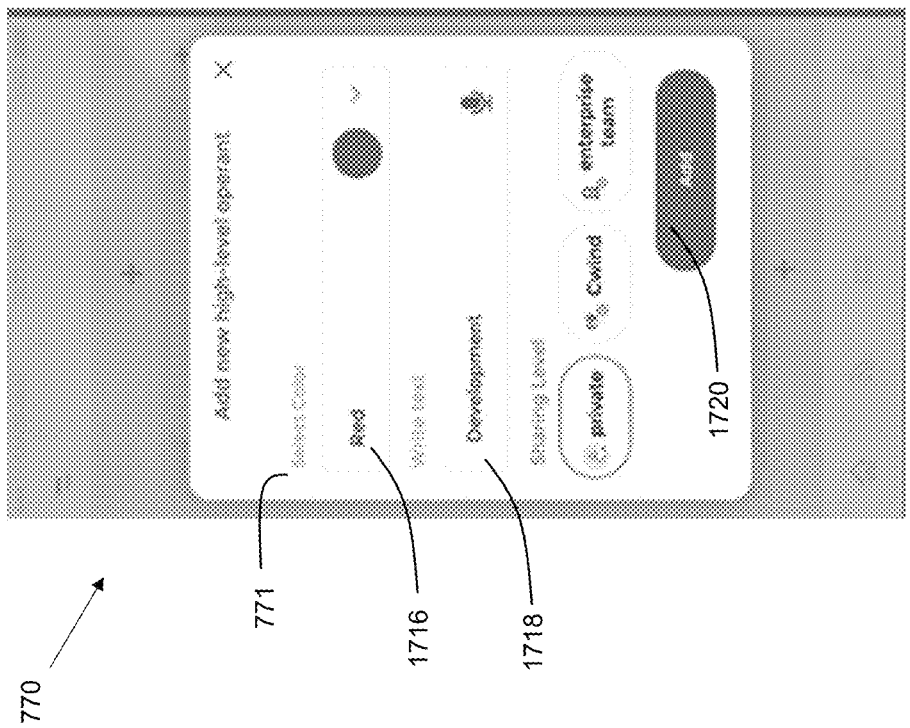

FIG. 7F shows user interface 770 with dialog box 771 for adding a new high level operant tag. The user may select a color in field 1716, and an operant tag name in field 1718. Once the user selects the Add button 1720, the user is presented with the user interface 772 of FIG. 7G, showing a graphical representation of the operant tag at segment 773.

Figure 7I:
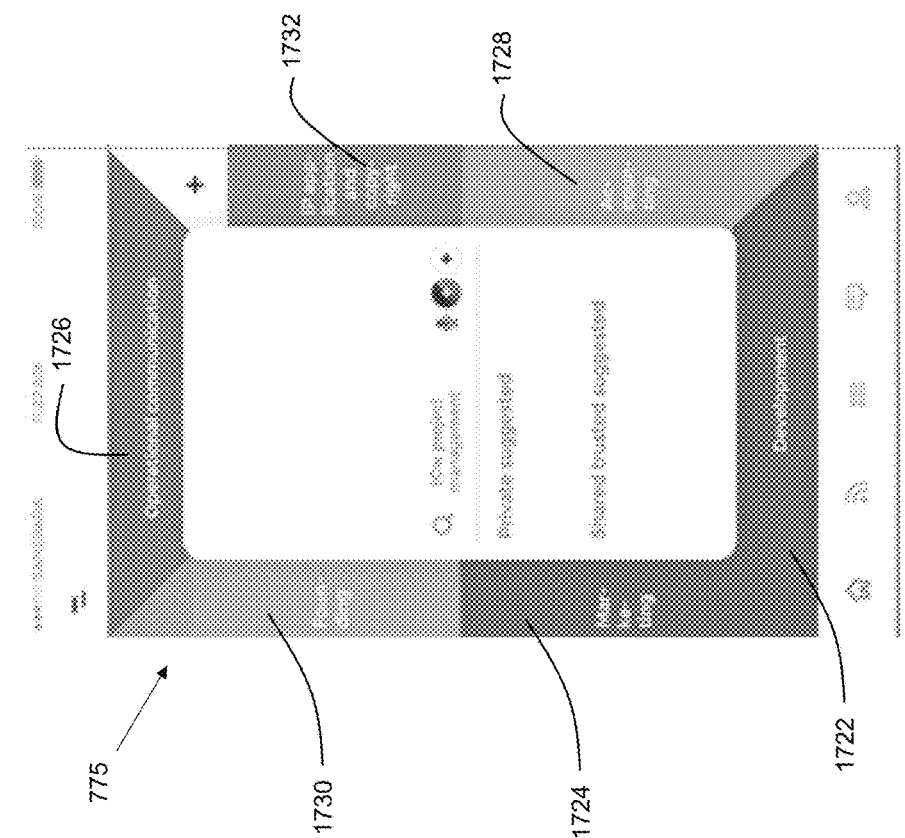
Figure 7H:
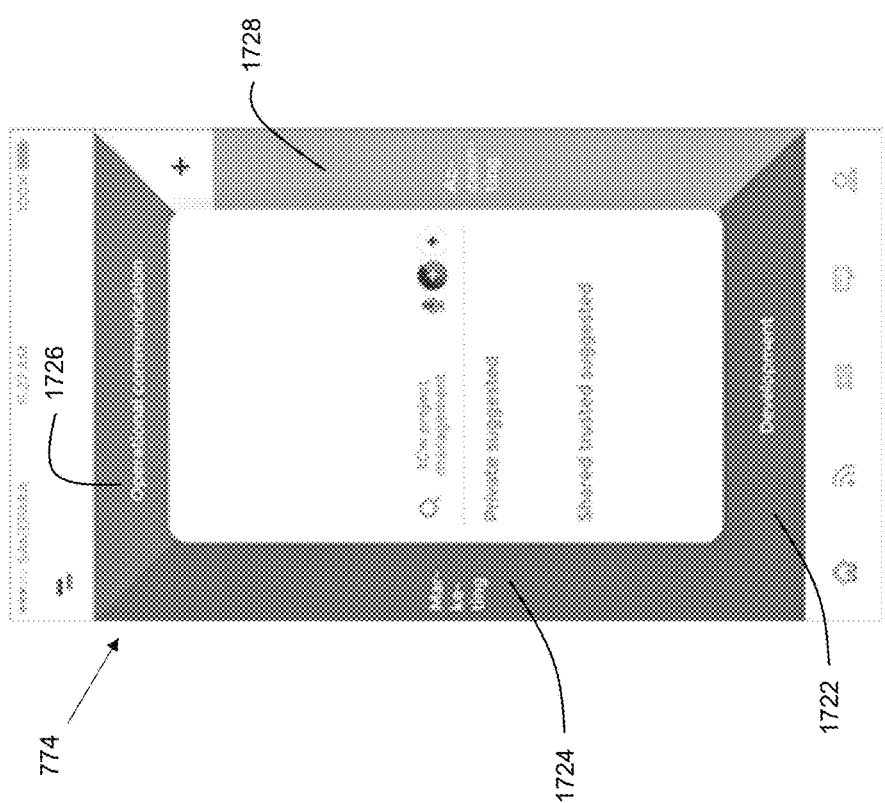
Figure 7K:
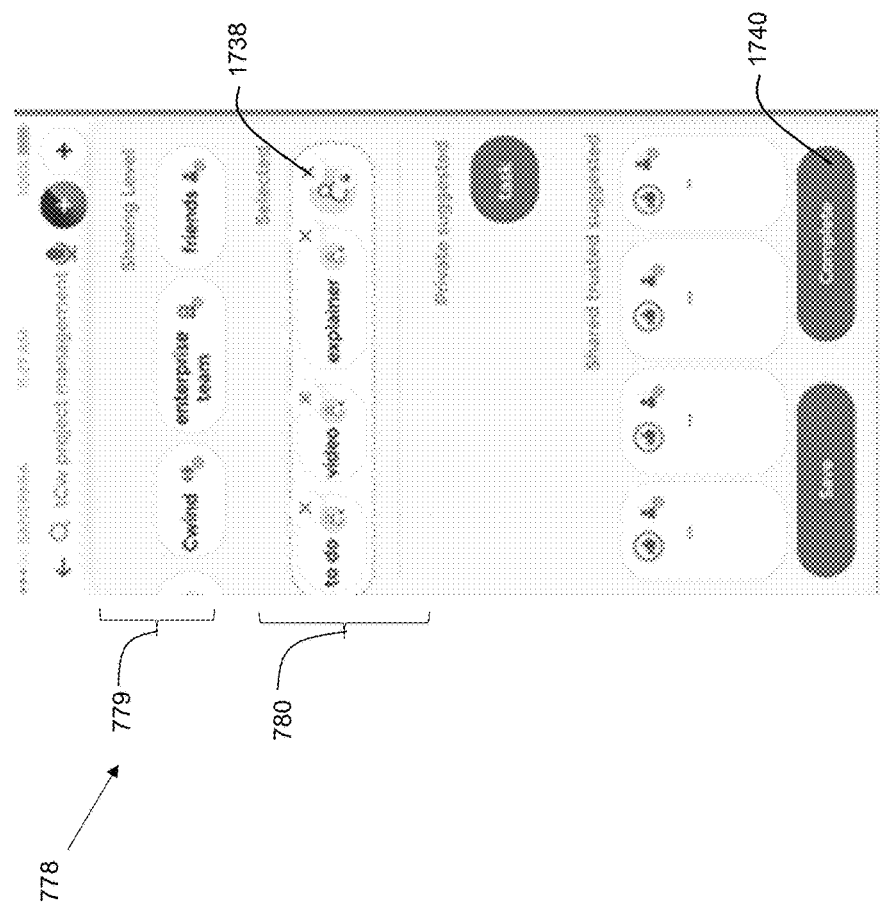

FIG. 7H shows user interface 774 indicating a circle with four operant tags, Development 1722, Marketing 1724, Operational Communication 1726, and Accounting 1728. More operant tags can be added. FIG. 7i shows user interface 775 indicating a circle with six operant tags, Development 1722, Marketing 1724, Operational Communication 1726, Accounting 1728, Founding 1730, and IP application and copyright 1732.

Figure 7J:
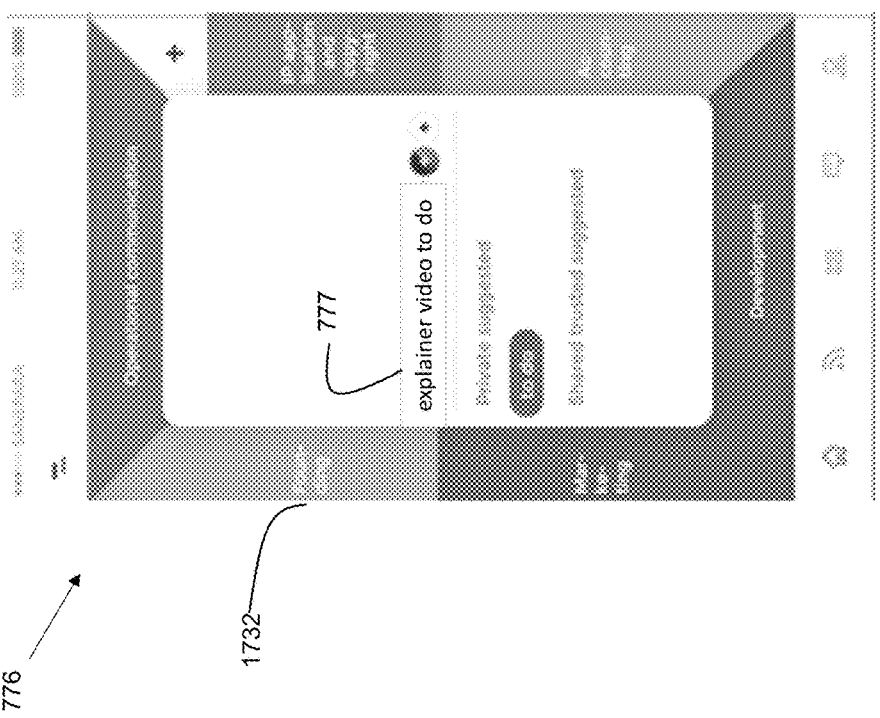

FIG. 7J shows an example of a user interface 776 with a task entry 777 entered within the frame 1732. The user may then be presented with user interface 778 of FIG. 7K. This shows group 779 of D-emojis/D-emoticons indicating sharing settings, and group 780 of D-emojis/D-emoticons based on the task entered at 777 in FIG. 7J. In embodiments, natural language processing may be used to perform entity detection, topic extraction, disambiguation, and/or other processing functions to generate the D-emojis/D-emoticons presented in group 780. The user can remove one or more of the suggested D-emojis/D-emoticons by tapping/selecting the X in the corner of each D-emojis/D-emoticons, and example of which is indicated by reference 1738. Once the user has the desired set of D-emojis/D-emoticons, after deleting any, the user then invokes the Complete button 1740 to proceed to the next step, as indicated in FIG. 7L. FIG. 7L shows user interface 781 with additional D-emojis/D-emoticons that may be suggested, as indicated by reference 782. The user invokes the Complete button 1742 to proceed to the next step, as shown in FIG. 7M. FIG. 7M shows user interface 784 with group 785 of D-emojis/D-emoticons including prioritization and categorization. Group 786 includes D-emojis/D-emoticons suggested for drafting a communication based on the entered task, and can include items such as contact information (phone numbers, e-mail, etc.), expected duration of a call, and time preferences for communication.

Figure 7N:
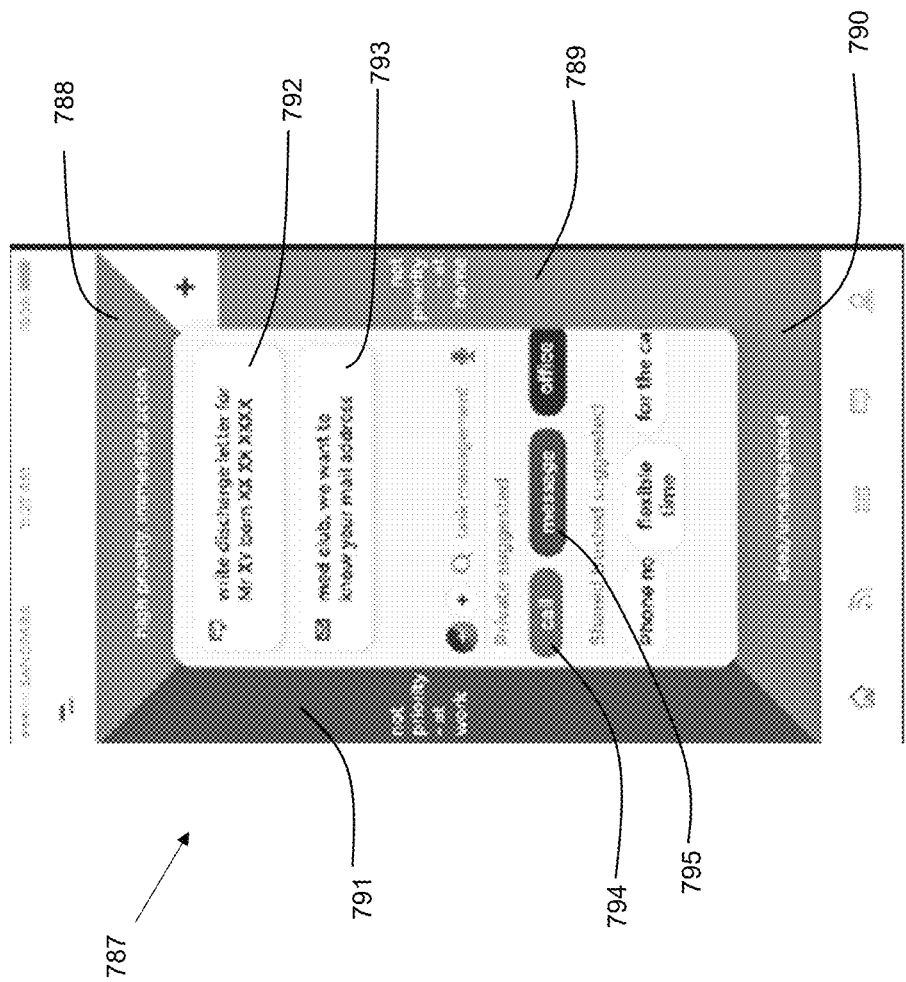

FIG. 7N shows user interface 787 indicating various communication activities that are displayed within the frame. The frame has four segments, including high priority 788, low priority home activity 789, low priority work activity 791, and uncategorized 790. Activities can include tasks such as task 792, and/or communication messages, such as e-mail 793. Reply options such as call 794 and/or messages 795 may also be presented. In embodiments, the communication activities can be assigned to a segment by selecting an activity and then selecting a corresponding segment. For example, for the message 793, about a request for a mailing address, a user can select that message 792, and then select segment 789 to classify the message as a low priority home activity. In this way, disclosed embodiments enhance task management and prioritization, leading to increased efficiency and time management.

Figure 7O:
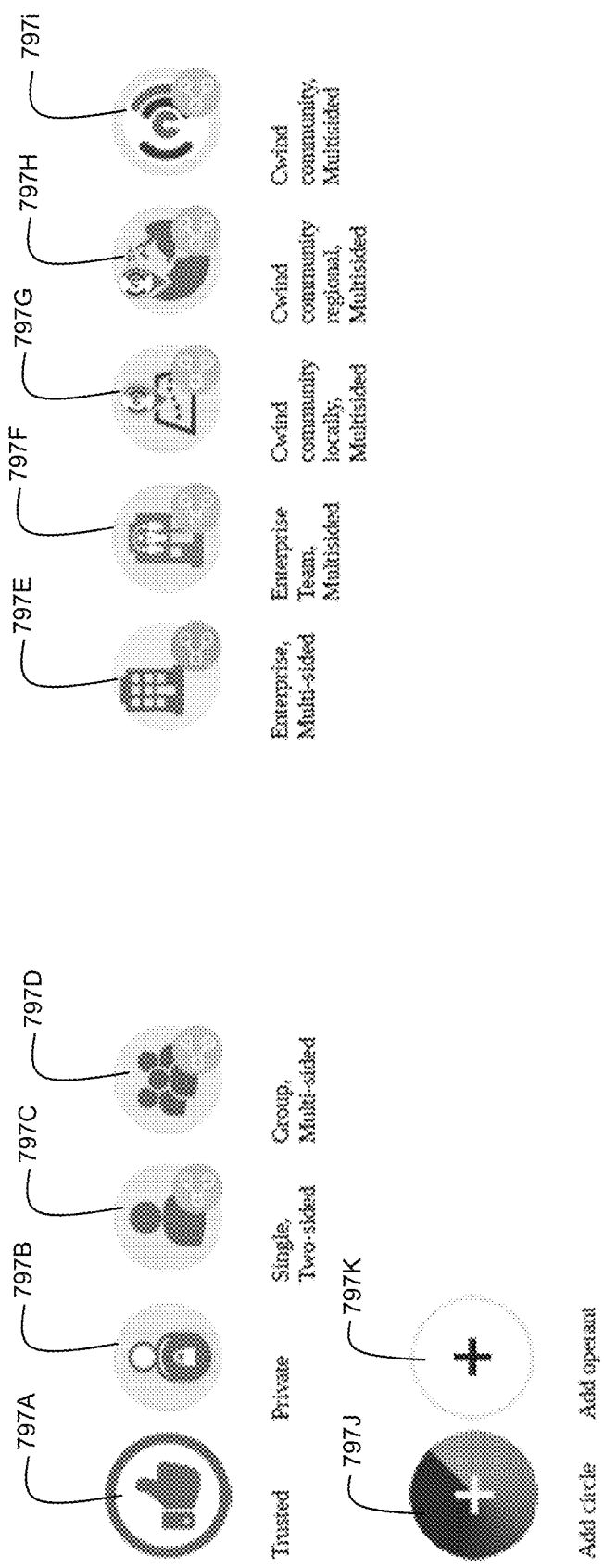

FIG. 7o shows examples of D-emojis/D-emoticons that may be present in some embodiments. Icon 797A shows an image representing trusted. Icon 797B shows an image indicating private. Icon 797C shows an image representing single, two-sided communication. Icon 797D shows an image representing group, multi-sided communication. Icon 797E shows an image representing enterprise, multi-sided communication. Icon 797F shows an image representing enterprise team, multi-sided communication. Icon 797G shows an image representing community local multi-sided, multi-sided communication. Icon 797H shows an image representing community regional multi-sided communication. Icon 797i shows an image representing community multi-sided communication. Icon 797J shows an image representing the add circle feature. Icon 797K shows an image representing the add operant tag feature. These icons are merely exemplary, and embodiments may have more, fewer, or different icons.

In embodiments, these D-emojis/D-emoticons based on operant tags (low level and high level operant tag(s), operant tag sequence(s) and operant tag circle(s)) may be displayed in place of a traditional keyboard for purposes of rating services and/or other user experiences. Operant tags visualize activity steps or workflow processes, that facilitate community flow games and cross services respectively. A multicolored "+" icon (797J of FIG. 7o) can be used to open/create a new circle e.g. "task management". A white "+" icon (797K of FIG. 7o) can be used to open/create a popup menu that allows any conditioning.

Each operant tag has a sharing level icon (FIG. 7o with private, friends (two-sided, multi-sided), groups (two-sided, multi-sided), enterprise (multi-sided icon) with defined content protection. For each operant tag sequence, a sharing level with sharing level icon on top is defined as well. If a user taps on a sharing level (e.g. 'friends') then it popups a list of friends whom the user can tag.

An operant tag sequence contains an overall sharing level of the whole operant tag sequence; an operant tag with sharing level and content operant tag; an operant tag with sharing level with content; a semantic action/semantic service operant tag. For each selected operant tag sequence private and shared trusted operant tags are suggested. For any semantic entry a sequence of operant tags is created. e.g. any note will automatically be divided into connected operant tags and added to the end of the raw "Selected". But any (large) operant tag sequence can be subdivided (by fingertip selection) into several sub-operant-sequences (each with heading high level operant tag). e.g. a whole text of a letter will be divide by the app into connected operant tags and at the end structured into high-level semantic-parts. On the other hand, any semantic operant tag can be fused to one operant tag by drag&drop.

According to the defined operant tags on the raw "Selected," the app will find matching information with the "private database" on the raw "Private suggested" and with the shared operant tags of the community on the raw "Shared trusted suggested".

The operant tags in the raw "Selected" should have no double in the raw "Private suggested" and no double in the raw "Public trusted suggested". Each raw with operant tags/operant tag sequences is horizontally scrollable. Each high level operant tag on the screen has different colors (colors occur in a predefined order e.g. blue, green, violet, green, yellow etc.) but in some embodiments, the color of a high level operant tag can be user defined and fixed. A white or low level operant tag becomes a high-level operant tag within the circle by swiping the operant tag over the multi colored "+" icon.

High level operant tags in an operant tag sequence are represented by different colored operant tags or as icons/symbols on top (instead of full colored operant tags. Icons are automatically used in the following situations: e.g. For each sharing level operant tag; For each trusted operant tag sequence; For each private and active operant tag sequence; For each private and inactive operant tag sequence; For each "device and channel" operant tag; For each "like" shared operant tag sequence; For each "dislike" shared operant tag sequence.

Tapping once on an operant tag shows the details of the operant tag conditions. Tapping twice on an operant tag in a short interval divides the operant tag into a connected operant tag sequence.

Some standard menus are available for bottom icons: e.g. Home, Social Feed, Services, Service Feed, Profile including access to User activity/service profile(s)—the same user can have several trusted profiles and non-trusted profiles Sharing level specific newsfeed via news bot (like WhatsApp user to user, or user to user group)

Sharing level specific servicefeed via service bot; service tracking of workflow or activity flow of different sharing level, with task delegation and verification in context of operant tag(s) circle with status check & progress of task e.g. project management, task management;

1. Address "informed consent"/"task" operant tag to contact(s)/other sharing level with(without) deadline/timer with addressed feedback (when completed), full log protocol with location stamp and timestamp (encrypted ID and private key for offline or on the 'Hyperledger Fabric' for backend function on the crypto module, in a legally compliant way; 2. Shared Decision Making and Tracking (bi-directional): address "verified (sub-)task" operant to (same) contact/other sharing level with short deadline/timer with addressed feedback (when completed) about one specific operant tag in one sequence, full log protocol with location stamp and timestamp (encrypted ID and private key for offline or on the 'Hyperledger Fabric' for backend function on the crypto module, in a legally compliant way); 3. Customer Relation Management with retargeting based on content marketing e.g. tracking of what user are sharing or need to share on/for provider services/products and interfaces or tracking what service provider is sharing. 4. (trusted) Voting/Survey (multi-directional): address operant tag based voting sequence, mean to address a verified task with bi-options/multi-options via questionnaire operant tag(s) →to trusted (two or multiple) contacts→with deadline/timer for voting→with addressed feedback (when completed) about one specific operant tag in one sequence, full log protocol with location stamp and timestamp (encrypted ID and private key for offline or on the 'Hyperledger Fabric' for backend function on the crypto module, in a legally compliant way). e.g. survey or feedback form for 'influencer feedback' to the app.

Information sharing center/service sharing center

Operant tag (sequence) in(ter)ferences menu of 2-/multiple (Semantic word operant tag or variable value) operant tag sequences or part of operant tag sequences in a grid of operant tags compared 1. to personal operant tags and 2. to Cwind community operant tags. e.g. search/interference/match job Menu for template selection of standard operant tag sequence(s) or circle library (followed by personalization)

ID specific protocol (with Hyperledger)

Mixed Reality (MR-) feed for any coincidence with the registered user based on operant tags; 1. View operant tag-location(frame) sequence e.g. make invisible coincidences visible with focus on location frame (location frame match)→conditioner operant tag sequence and action operant tag; 2. View operant tag-time(frame) sequence "Dynamic agenda on calendar; main situational (at home/work/on the way home/on the way to work)/local timetable with fix and flexible time windows" e.g. make invisible coincidences visible with focus on time frame (time frame match)→conditioner operant tag sequence and action operant tag; 3. View operant tag-location(frame) in operant tag-time(frame) 4. View Enterprise Resource Planning (ERP): View system of inference between personal resource demand operant tag and resource-allocation operant tag of operant tag sharing level 'enterprise' e.g. make invisible coincidences visible with focus on resource allocation (warehouse match)→conditioner operant tag sequence and action operant tag e.g. notification operant tag "no lamp of type xyz" e.g. for just-in-time posting, just-in-time transport sharing, just-in-time situational/coincidence support in a sharing level setting e.g. at work Screen for prosumer or service provider menu development based on operant tag(s)

Menu for Information Neutralization of operant tag sequence(s)

Measurements of services with system specific and approved measurements (user can request for measurement acceptance, but system "moderator" need to approve each measurement);

User specific dynamic agenda menu (with focus on private framework, frame or other user time frames/user location frames/user situations defined by operant tag sequences); User process map/mapping (work, activities) e.g. detect flow blocker situations for seamless activity/workflow flow, "doorkeeper operant tag" identification and action operant tag implementation Service trusting (two-sided, QR-code verification, professional email, User process map (work, activities)

User specific "offline" simulation

User specific best situational channel

Mixed Reality Screen for any coincidence with the registered user

Standard filters based on user operant tags

Overview of interactive e-study protocols

Object activity flow of different sharing levels with regard to different location "Issue specific" sharing or collaboration with a specific sharing level Proposal menu so that a user can provide new operant tags activities, services or measurements (may be approved by the service community in the sense of a service moderator)

Personal link manager menu based on operant tag circles: high level operant tags for link categorization Standard menu for setting up filters e.g. app channels for each device, (service contacts) based on user operant tags User specific "offline" simulation menu based on "personal knowledge tree" or "personal grid of operant tags"—to test app when user is offline Special features: Voice command-to-action/Voice-to-text Special features: Fingertip grab/screen capture with Screen-Freezing bottom and Text selection bottom and import-to-operant tag available on a window-in-window, widget and any other screen of any application.

System specific: content marketing menu

System specific: user trusting automation (Trusting cascade with X-factor verification: including QR-code-view&scan-operant tag for two-sided questions&answers/activities/relations/services, e-ID verification, transcript (Certifications/Qualifications-masters/diploma/industry registration) verification, GLN database verification, professional email verification, passport picture verification, driver license, banking account payment verification, yellow pages database verification, mobile phone number verification (mobile channel), two-sided (QR-code based) profile-operant tag sequence verification, fingerprint verification. (each step with full log protocol with location stamp and timestamp and linked to an encrypted ID and private key for offline or on the 'Hyperledger Fabric' for backend function on the crypto technology, in a legally compliant way)

System specific: service/measurement approval tag

System specific: Evaluation and Trusting panel of users

System specific: admin panel menu

Other situations are possible in embodiments of the present invention.

Figure 8A:
FIG. 8A-8C show a mixed reality user experience in accordance with embodiments of the present invention.
Figure 8B:
Figure 8C:
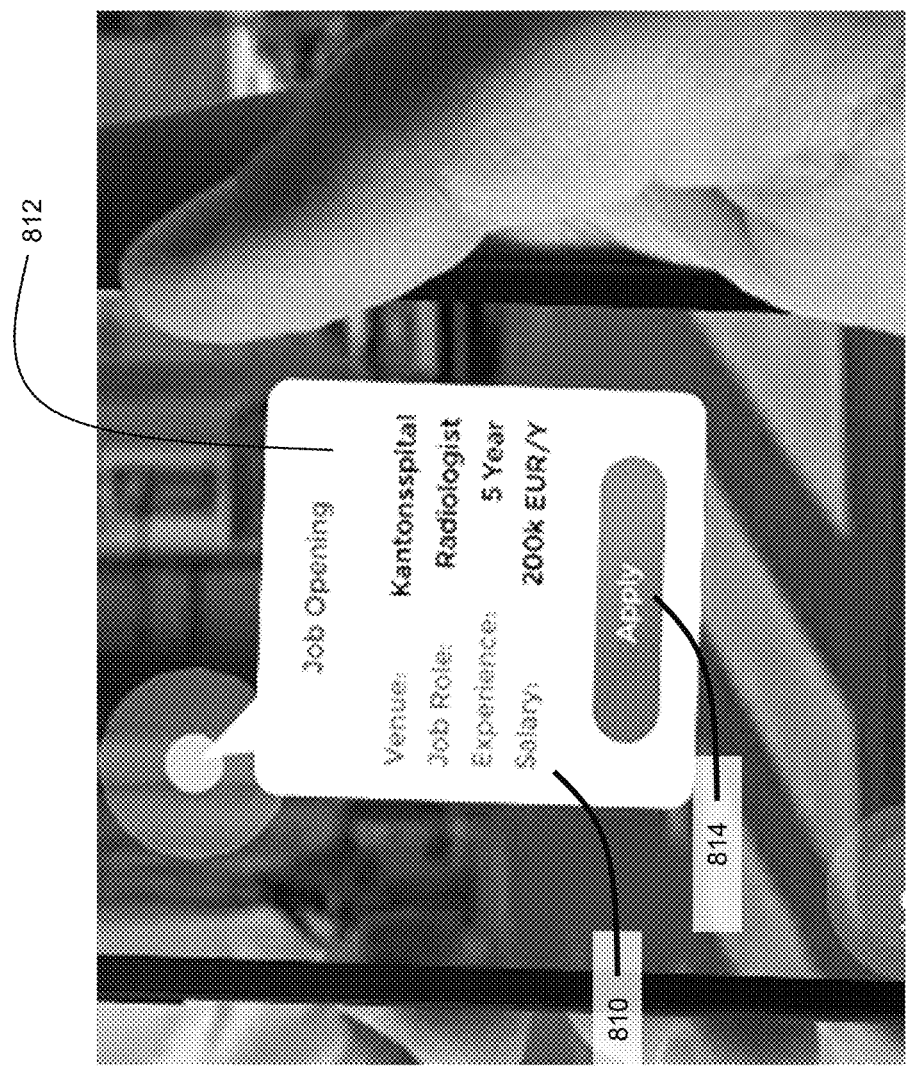

FIG. 8A-8C show a mixed reality user experience in accordance with embodiments of the present invention. Referring now to FIG. 8A, a mobile device 802 renders a live scene with virtual information points (indicated generally as 806) rendered thereon. The user can then learn more about the virtual information point by touching it, causing a corresponding notification 810 to be displayed, as shown in FIG. 8B. FIG. 8C shows additional detail of the notification 810, which includes textual information 812 pertaining to a job offer. The notification further includes a job application control 814. If the user selects the job application control 814, it can present a form for them to complete to apply for the given job. The mixed reality allows a user to identify job openings in a given neighborhood, office complex, or other suitable location. In some embodiments, the notification may include an offer for sale, purchase, and/or rental. In some embodiments, the offer can be for products and/or services. The service offers can be one-time purchases, or subscriptions.

Figure 9B:
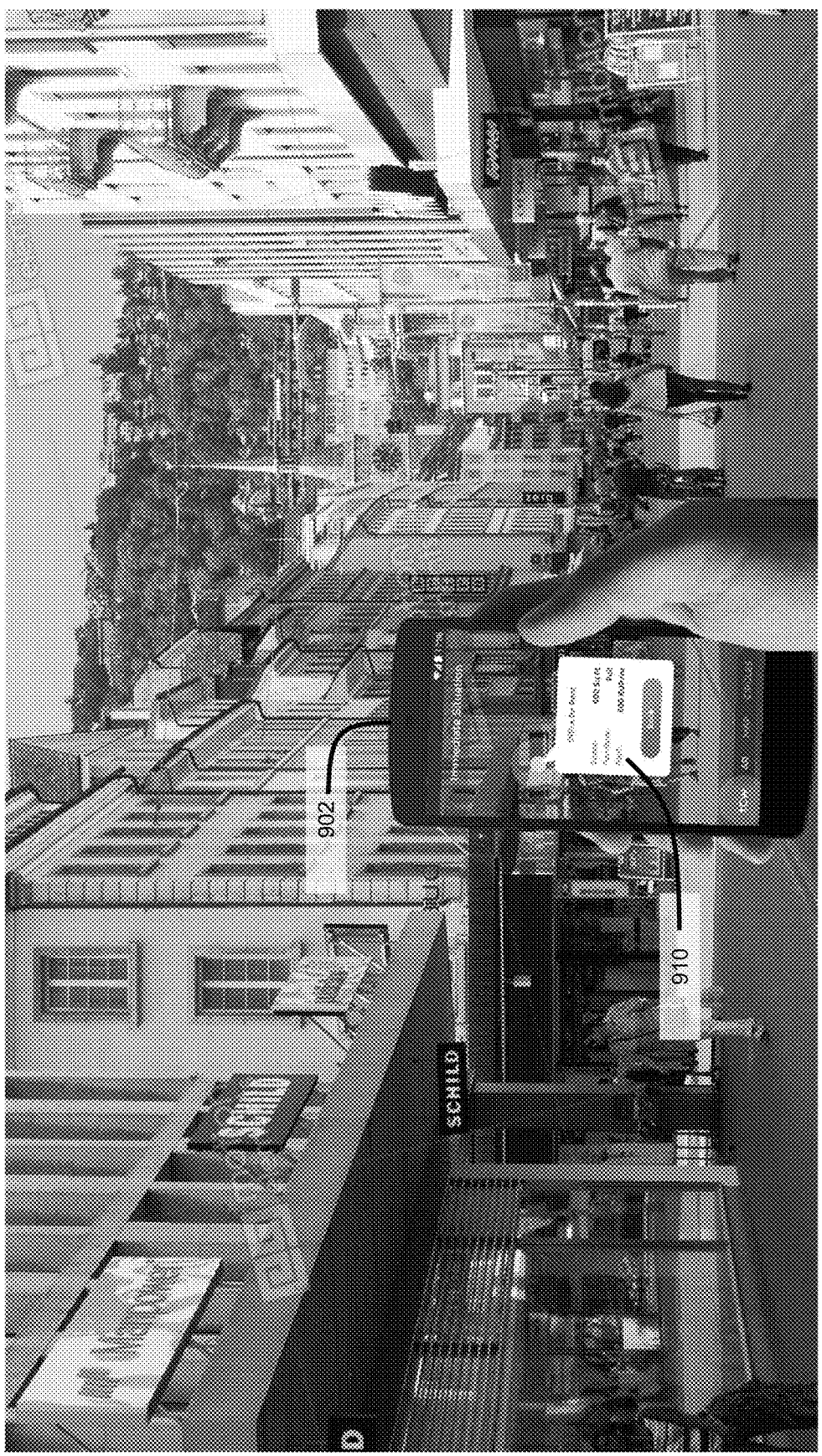
Figure 9C:
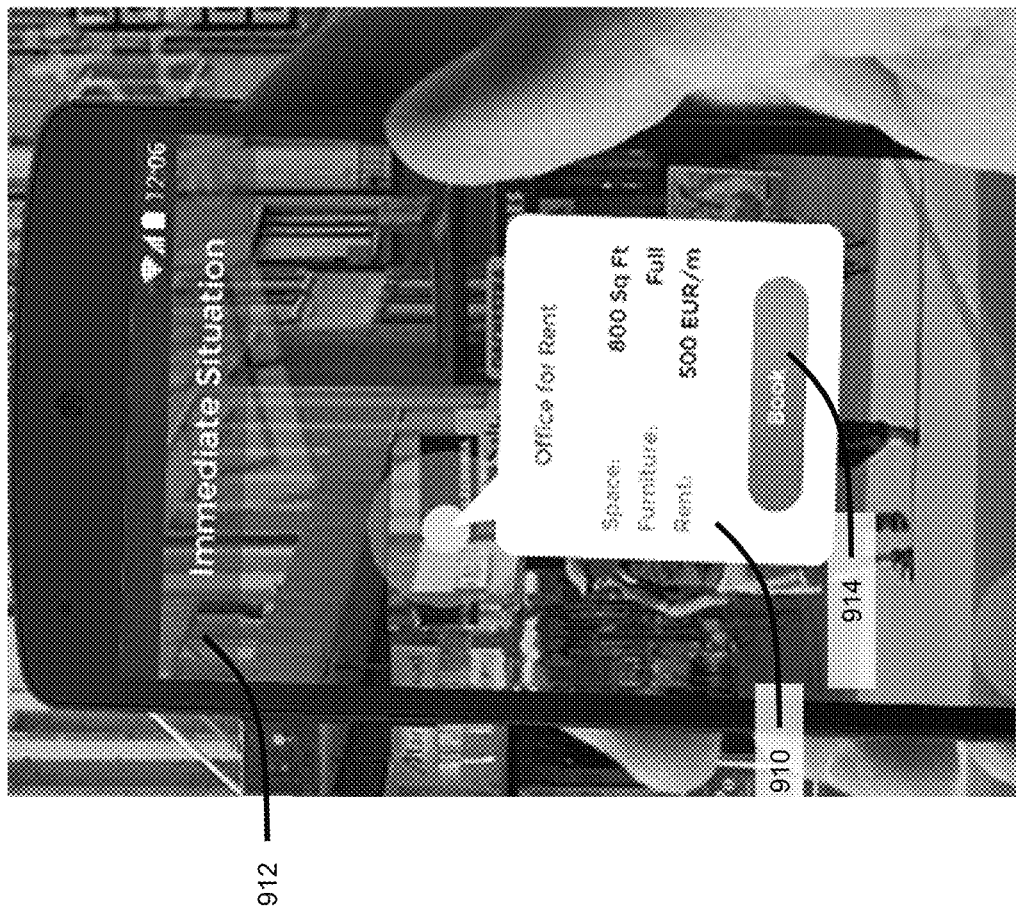

FIG. 9A-9C show another mixed reality user experience in accordance with embodiments of the present invention. Referring now to FIG. 9A, a mobile device 902 renders a live scene with virtual information points (indicated generally as 906) rendered thereon. The user can then learn more about the virtual information point by touching it, causing a corresponding notification 910 to be displayed, as shown in FIG. 9B. FIG. 9C shows additional detail of the notification 910, which includes textual information pertaining to a rental offer. The notification further includes a rental application control 914. If the user selects the rental application control 914, it can present a form for them to complete to apply for the given rental property. The mixed reality allows a user to identify available rentals in a given neighborhood, office complex, or other suitable location. Additionally, a visual notification 912 may be displayed on the user interface when virtual information points are available. Furthermore, an audio and/or vibratory alert may also be rendered when visual information points are available, thus prompting the user to view the surrounding area via mixed reality to obtain the desired information.

Figure 10A:
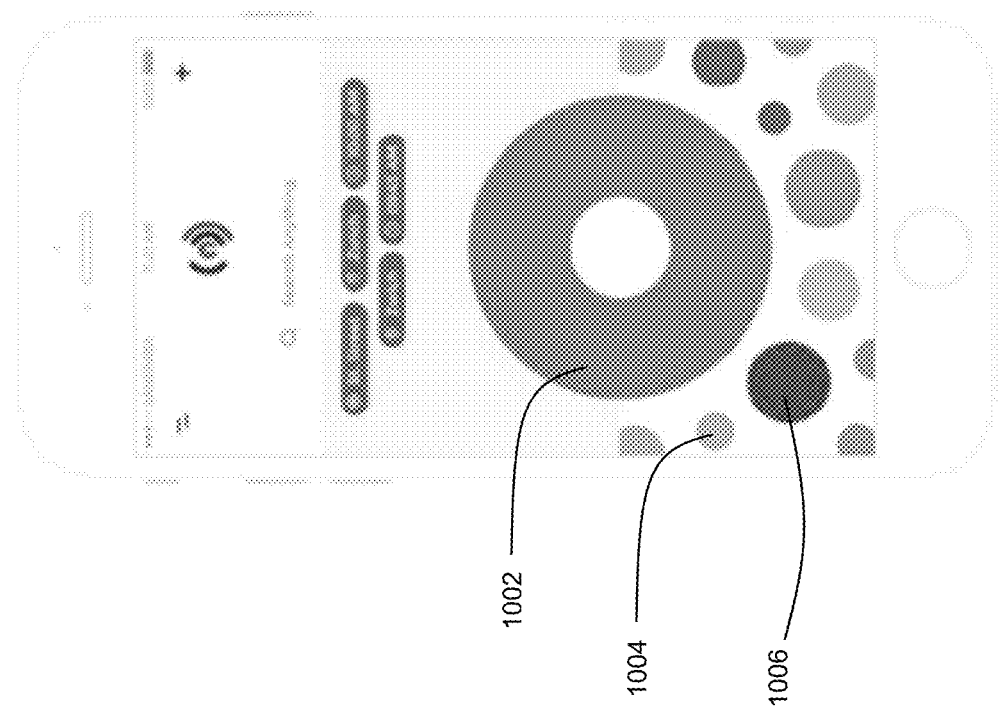
FIG. 10A-10D show a circular graphical element search user experience in accordance with embodiments of the present invention.
Figure 10B:
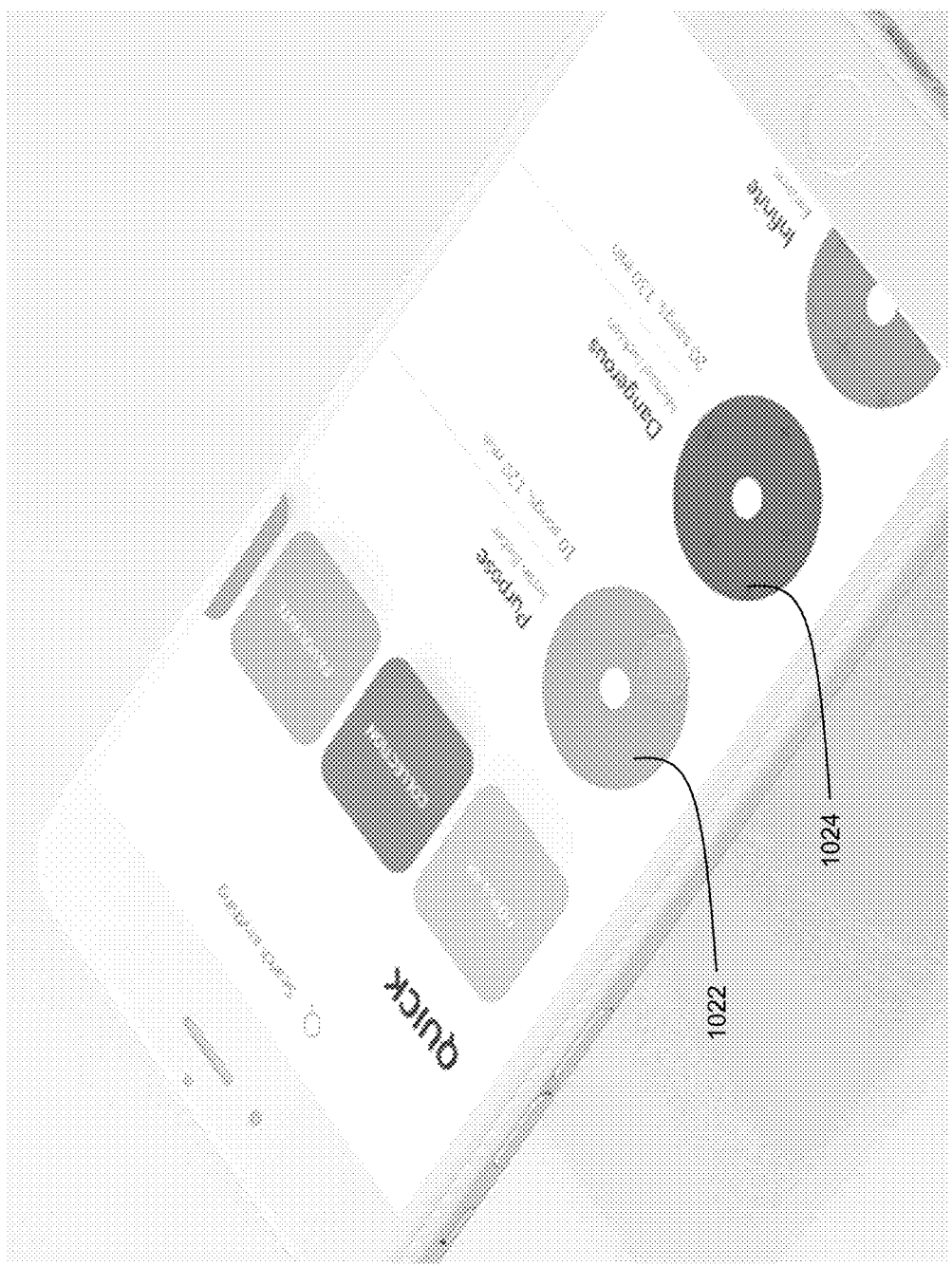
Figure 10C:
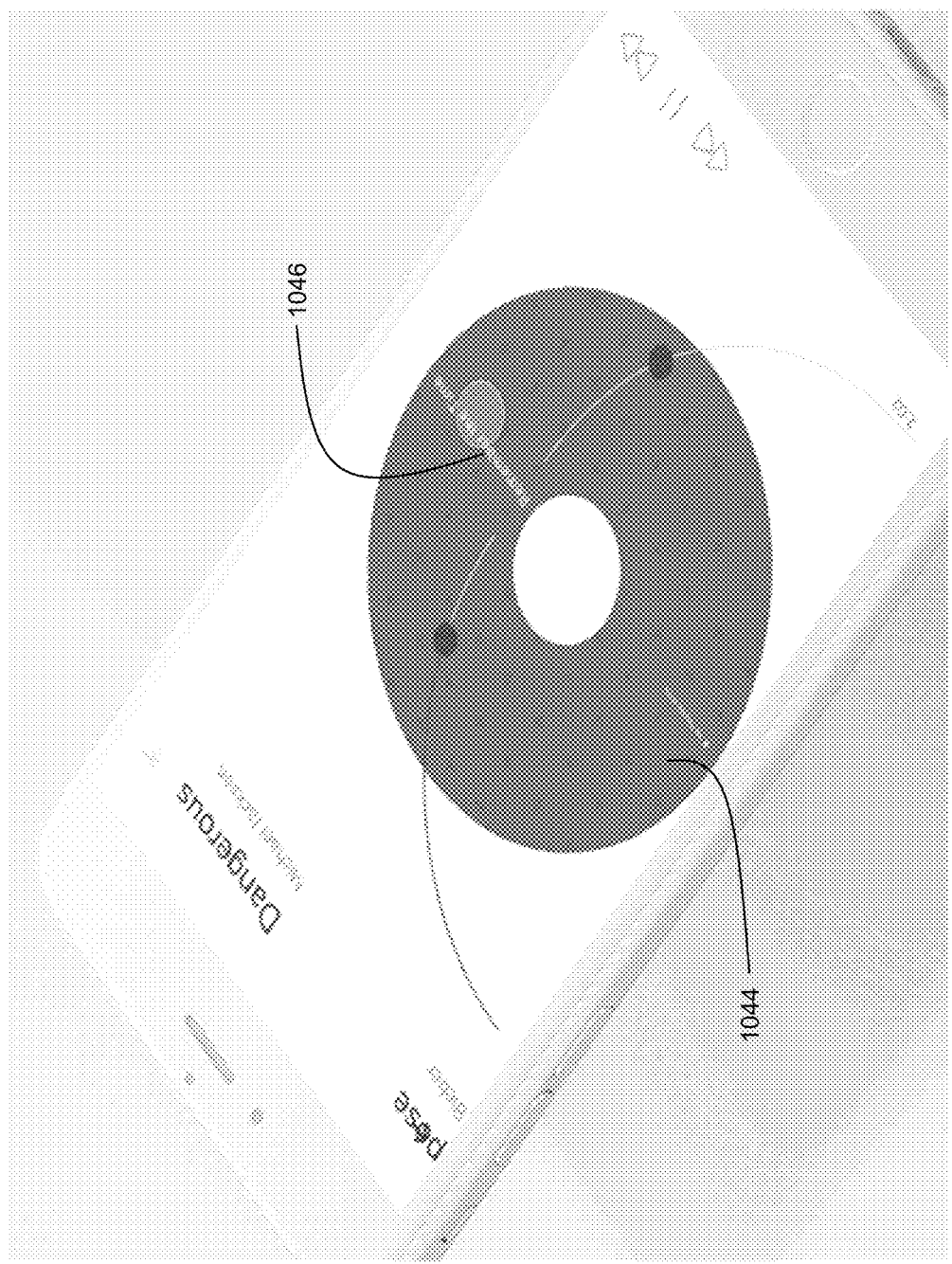
Figure 10D:
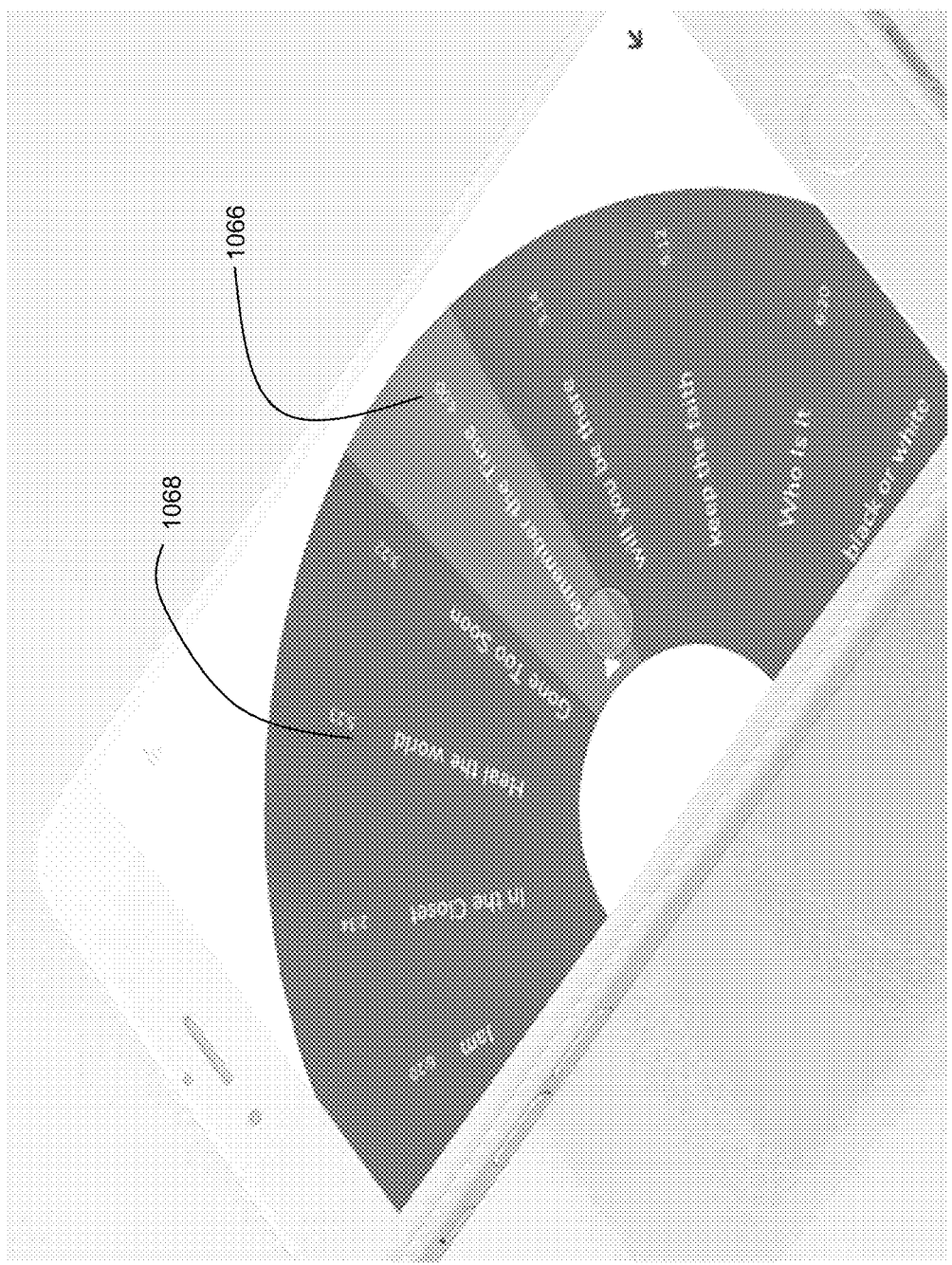

FIG. 10A-10D show a circular graphical element search user experience in accordance with embodiments of the present invention. Referring to FIG. 10A, in response to a search, a plurality of circular shaped graphical elements is rendered on user interface 1000, and some of the circular shaped graphical elements are indicated as 1002, 1004, and 1006. The circular shaped graphical elements can be ring shapes such as 1002, or solid circle shapes such as 1004 and 1006. In embodiments, the size of each circular shaped graphical element is based on relevance. Thus, in embodiments, the search result pertaining to circular shaped graphical element 1002 is more relevant than the search result pertaining to circular shaped graphical element 1006. Similarly, the search result pertaining to circular shaped graphical element 1006 is more relevant than the search result pertaining to circular shaped graphical element 1004. In some embodiments, the color and/or fill pattern may be based upon a category of a search result. As an example, a search for food may render search results that include food markets in one color, restaurants in another color, and search results including information about food regulations in another color (or fill pattern). In this way, a user can quickly assess search results and relevance using a graphical format. Furthermore, the circular shaped graphical elements can be used to further review and inspect the search results, as shown in FIGS. 10B-10D.

Referring now to FIG. 10B, a plurality of circular shaped graphical elements is shown on user interface 1020, and some of the circular shaped graphical elements are indicated as 1022, and 1024. Referring now to FIG. 10C, the user interface 1040 is shown in response to a user selecting circular shaped graphical element 1044. A current item is then shown in field 1046. Referring now to FIG. 10D, an inspection mode for the circular shaped graphical element is shown. In embodiments, the user may invoke inspection mode via a double tap or other suitable gesture while on the user interface screen shown in FIG. 10C. The user interface then progresses to FIG. 10D where multiple segments are shown, including current item 1066 and additional text labels for additional items that are rendered in the corresponding segments. An example of a corresponding segment is indicated as 1068. This embodiment is well suited for container style objects. As an example, a music album can be considered as a container that holds multiple items (songs). In embodiments, current item 1066 represents a current playing song, while 1068 represents a related item (another song on the album). In embodiments, the user may select the related item to make it the current item. The selection mechanism can include double tapping the related item, rotating the control so the related item is in a horizontal orientation with respect to the user interface 1060, or other suitable mechanism. The user may also rotate the control as a mechanism for browsing the contents of the container (in this case, all the songs in the album). Note that while this example shows a music album, the disclosed controls can be used for a variety of digital items and corresponding metadata. Thus, in embodiments, the circular shaped graphical element, upon selection, renders a text label of a current item. In some embodiments, the circular shaped graphical element, upon selection, renders a text label of a related item in a corresponding segment.

Figure 11:
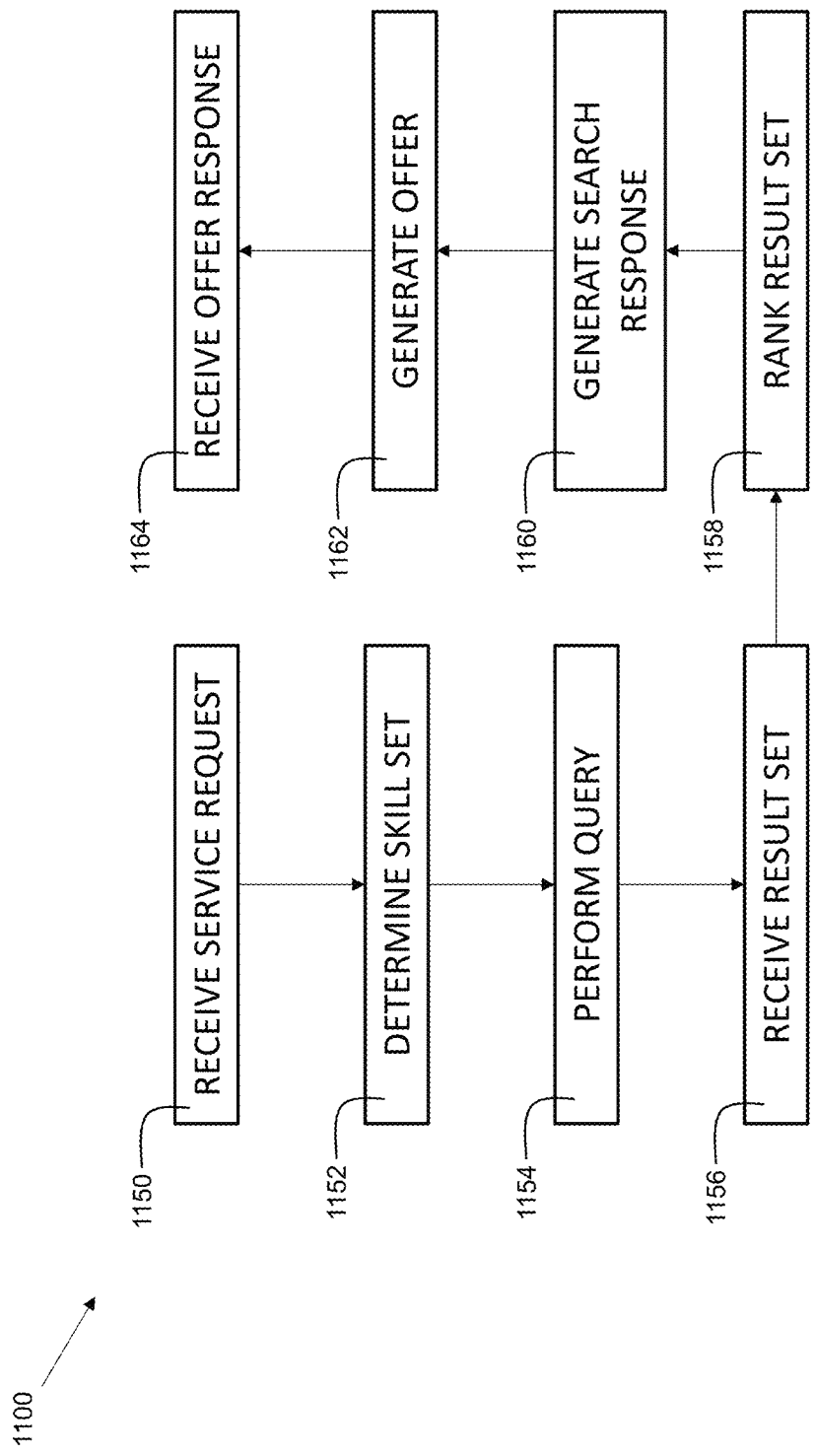
FIG. 11 is a flowchart indicating process steps for embodiments of the present invention.

FIG. 11 is a flowchart 1100 indicating process steps for embodiments of the present invention. At process step 1150, a service request is received (e.g. by the collaboration server). At process step 1152, a skill set is determined for the service request. This can include performing a computerized natural language analysis to extract keywords, perform disambiguation, context, and/or other processes. As an example, a service request containing phrases such as "web development" or "test" may be interpreted as elements of a desired skill set put forth by the received service request. At process step 1154 a query is performed based on the skill set. The query may search one or more professional databases, social media systems, and/or other search engines to find businesses and/or individuals that may align well with the desired skill set. At process step 1156, a result set is received from the one or more professional databases, social media systems, and/or other search engines. At process step 1158 the result set is ranked. The ranking can be performed on a variety of criteria, including, but not limited to geographic location, hourly rate, previous project and/or employment experience, number of followers on social media, number of blog posts, languages spoken, and/or education level. In process step 1160, a search response is generated, including the ranked result set, which may include one or more individuals and/or businesses that can meet the criteria and skill set from the service request. Such an example of a response is shown at 706 in FIG. 7A. At process step 1162 an offer is generated. The offer may be initiated by the same party that initiated the service request. In process step 1164 an offer response is generated. This can be initiated by the party that received the offer. In embodiments, the offer is for services of a knowledge worker, amateur, or firm.

Figure 12:
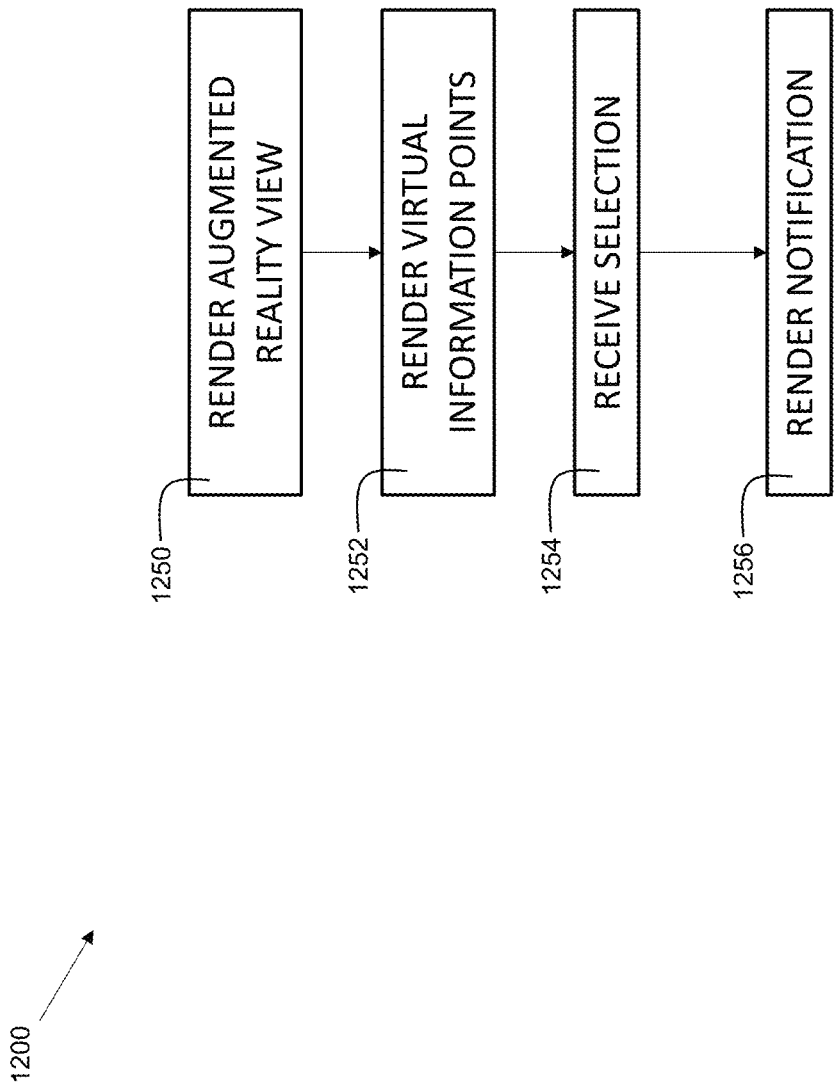
FIG. 12 is a flowchart indicating process steps for additional embodiments of the present invention.

FIG. 12 is a flowchart 1200 indicating process steps for additional embodiments of the present invention. In process step 1250, a mixed reality view is rendered in a mobile device. At process step 1252, one or more virtual information points are rendered on the mixed reality display. An example of this is shown in FIG. 8A. In embodiments, each virtual information point may be stored in the collaboration server or a connected database accessible by the collaboration server. Each virtual information point may have a plurality of data fields associated with it, including a geographic location (e.g. latitude, longitude, altitude, and/or street address). When a geolocation receiver within a mobile device identifies a current position within a predetermined distance from the location of the virtual information point, and the mobile device is oriented in the appropriate direction based on the travel path, internal compass information, and or other information, virtual information points that match a given criteria (e.g. job offers, office rentals, etc.) are rendered. In process step 1254, a selection of a virtual information point is received. In embodiments, this may be performed by a user tapping, swiping, or otherwise selecting the virtual information point. At process step 1256, a notification is rendered, providing additional information regarding the virtual information point. Examples of a rendered notification are shown in FIG. 8C and FIG. 9C.

Figure 13:
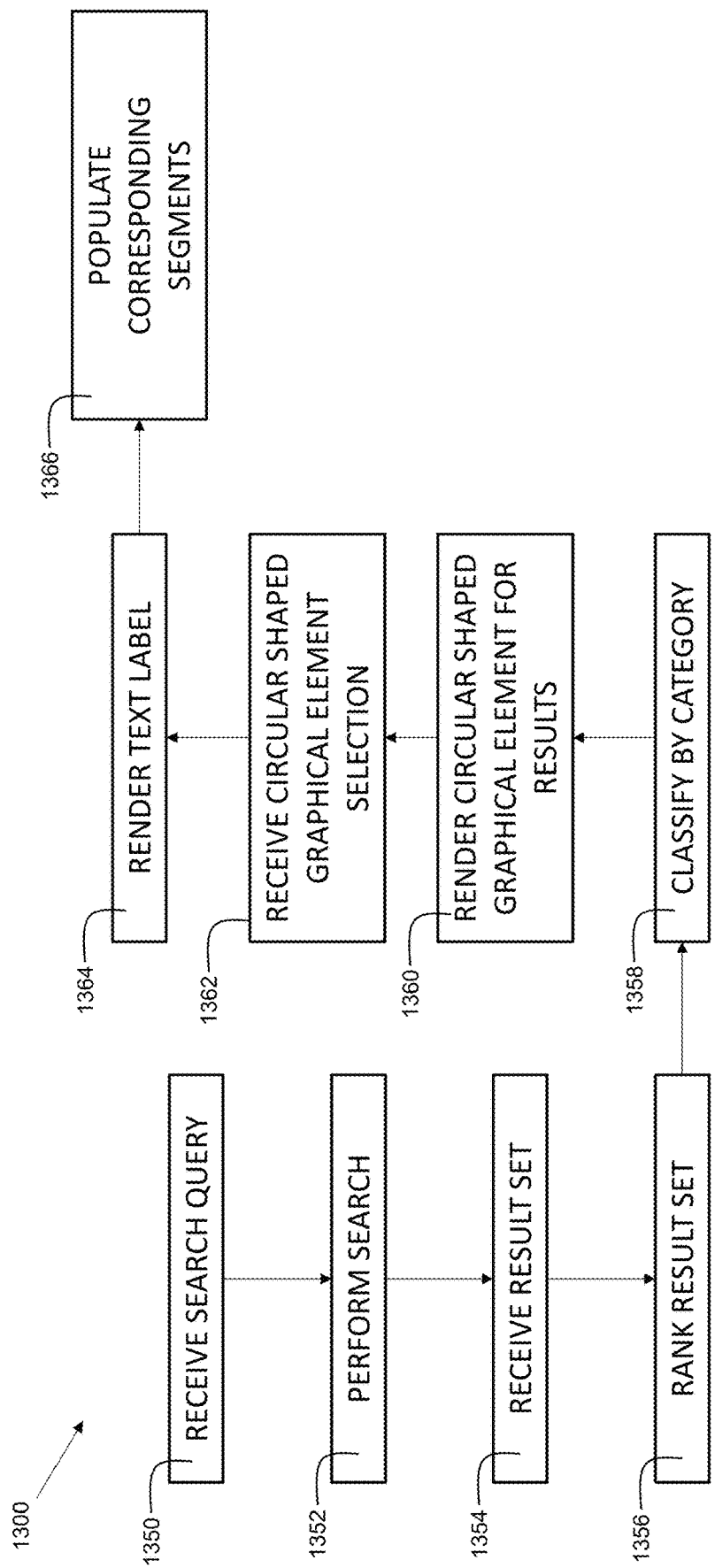
FIG. 13 is a flowchart indicating process steps for additional embodiments of the present invention.

FIG. 13 is a flowchart 1300 indicating process steps for additional embodiments of the present invention. At process step 1350, a search query is received. At process step 1352, a search is performed using one or more search engines, social media sites, and/or other suitable sources. In process step 1354, a result set is received from the search. In process step 1356, the result set is ranked based on various criteria to indicate relevance. In process step 1358, the result set items may optionally be classified by category. In process step 1360, a circular shaped graphical element is rendered for the results. Examples of this are shown in FIG. 10A-10D. In process step 1362, a circular shaped graphical element selection is received. In embodiments, this may be received by tapping, swiping, or otherwise selecting the circular shaped graphical element. In process step 1364 a text label is rendered. An example of this is shown at 1046 in FIG. 10C. In process step 1366, corresponding segments are populated with text information. An example of this is shown in FIG. 10D with 1068 indicated as one of the populated segments.

As can now be appreciated, disclosed embodiments provide improvements in collaboration via social media platforms. Embodiments can serve as an improved client, peer and industry relationship manager (CPIRM), to help individuals and companies run their business. Disclosed embodiments allow connection with peers, formation of groups, and/or inviting of users to join groups or engage in other forms of communication. Embodiments can also function as an advertising system, allowing users to promote their business, as well as promote events, engage in giveaways, competitions, and other promotions, as well as post job vacancies. Additionally, disclosed embodiments can greatly enhance productivity by allowing a mobile device to manage tasks of varying importance and problems on different platforms simultaneously with different coworkers having different backgrounds.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

Each of the above methods may be executed on one or more processors on one or more computer systems. Embodiments may include various forms of distributed computing, client/server computing, and cloud based computing. Further, it will be understood that the depicted steps or boxes contained in the disclosed flowcharts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Any and all such functions, generally referred to herein as a "circuit," "module," or "system" may be implemented by computer program instructions, by special-purpose hardware-based computer systems, by combinations of special purpose hardware and computer instructions, by combinations of general purpose hardware and computer instructions, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

It will be appreciated that computer program instructions may include computer executable code. A variety of languages for expressing computer program instructions may include without limitation C, C++, Java, JavaScript™, assembly language, Perl, Python, Django, Laravel/PHP, Ruby, Ruby on Rails 5, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Furthermore, the method steps shown are intended to include any suitable method of causing one or more parties or entities to perform the steps.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A system configured to implement a method for multiparty collaboration, the system comprising:
   a network;
   at least one client device connected to the network, the at least one client device comprising a Hyperledger interface such that the at least one client device utilizes a crypto technology built using Hyperledger Fabric for backend functions;
   at least one module implemented via software executing on a collaboration server or the at least one client device, wherein the at least one module comprises a crypto module; and
   the crypto module being configured to provide networking constructs enabling distributed redundancy with no single point of failure,
      wherein the networking constructs comprise Cwind service chains and blockchains, and
      wherein each of the networking constructs are configured to:
         record and index movement of a party to create a searchable database of every transaction; and
         store transaction data across networks of computers in a decentralized nature that constantly check and verify information with each other to make every transaction resistant to corruption or unauthorized altering of content; and
   the collaboration server connected to the network and being configured to:
      receive a service request from the at least one client device;
      determine a skill set corresponding to the service request;
      perform a query based on at least one skill of the skill set;
      receive a result set based on the service request, wherein the result set includes one or more profile entries corresponding to the at least one skill;
      sort the result set based on ranking criteria and relevance, wherein the ranking criteria comprises: a number of social media followers and a number of projects of an account associated with a profile of the one or more profile entries; and
      render, on a user interface of the at least one client device, a graphical display based on the service request,
         wherein the graphical display comprises a plurality of circular shaped graphical elements,
         wherein each circular shaped graphical element of the plurality of circular shaped graphical elements corresponds to a result of the result set, and
         wherein a size of each circular shaped graphical element of the plurality of circular shaped graphical elements is based on the relevance.

2. The system of claim 1, wherein the ranking criteria further comprises a previous employer of the account associated with the one of the one or more profile entries.

3. The system of claim 1, wherein a same party that initiated the service request is configured to:
   generate an offer for a service or product; and
   send the offer to the account associated with the profile of the one or more profile entries.

4. The system of claim 3, wherein the same party that initiated the service request is configured to receive an acceptance for the offer from the account associated with the profile of the one or more profile entries.

5. The system of claim 4, wherein the account associated with the profile of the one or more profile entries is configured to receive a rating for the service or product.

6. The system of claim 5, further comprising a database configured to store the rating.

7. A system configured to implement a method for graphically indicating search result relevance, the system comprising:
   a network;
   at least one client device connected to the network, the at least one client device comprising a Hyperledger interface such that the at least one client device utilizes a crypto technology built using Hyperledger Fabric for backend functions;
   at least one module implemented via software executing on a collaboration server or the at least one client device, wherein the at least one module comprises a crypto module; and
   the crypto module being configured to provide networking constructs enabling distributed redundancy with no single point of failure,
      wherein the networking constructs comprise Cwind service chains and blockchains, and
      wherein each of the networking constructs are configured to:
         record and index movement of a party to create a searchable database of every transaction; and
         store transaction data across networks of computers in a decentralized nature that constantly check and verify information with each other to make every transaction resistant to corruption or unauthorized altering of content; and
   the collaboration server connected to the network and being configured to:
      perform a search based on a received search query from the at least one client device;
      receive a result set based on the search query;
      classify the result set by category;
      rank the result set by relevance; and render, on a user interface of the at least one client device, a graphical display comprising a plurality of circular shaped graphical elements,
- wherein each circular shaped graphical element of the plurality of circular shaped graphical elements corresponds to a result of the result set,
- wherein a color of each circular shaped graphical element of the plurality of circular shaped graphical elements is based on the category, and
- wherein each circular shaped graphical element of the plurality of circular shaped graphical elements, upon selection, renders a text label of a current item.

8. The system of claim 7, wherein a size of each circular shaped graphical element of the plurality of circular shaped graphical elements is based on the relevance.

9. The system of claim 7, wherein each circular shaped graphical element of the plurality of circular shaped graphical elements, upon selection, further renders a text label of a related item in a corresponding segment.

10. The system of claim 9, wherein the collaboration server is further configured to render, on the user interface of the at least one client device, the related item upon receiving a selection of the corresponding segment.

* * * * *